(12) United States Patent
Okuyama et al.

(10) Patent No.: US 12,265,308 B2
(45) Date of Patent: Apr. 1, 2025

(54) DISPLAY DEVICE

(71) Applicant: Japan Display Inc., Tokyo (JP)

(72) Inventors: Kentaro Okuyama, Tokyo (JP);
Yoshihide Ohue, Tokyo (JP); Hiroki Sugiyama, Tokyo (JP); Tomoyuki Tada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/517,743

(22) Filed: Nov. 22, 2023

(65) Prior Publication Data

US 2024/0094585 A1    Mar. 21, 2024

Related U.S. Application Data

(63) Continuation of application No. 17/402,792, filed on Aug. 16, 2021, now Pat. No. 11,846,854, which is a continuation of application No. PCT/JP2020/003032, filed on Jan. 28, 2020.

(30) Foreign Application Priority Data

Feb. 14, 2019    (JP) ................................ 2019-024586

(51) Int. Cl.
*G02F 1/1362* (2006.01)
*G02F 1/1334* (2006.01)
*G02F 1/1368* (2006.01)

(52) U.S. Cl.
CPC ...... *G02F 1/136209* (2013.01); *G02F 1/1334* (2013.01); *G02F 1/136227* (2013.01); *G02F 1/136268* (2021.01); *G02F 1/1368* (2013.01)

(58) Field of Classification Search
CPC ......... G02F 1/133512; G02F 1/133509; G02F 1/136209; H01L 29/78633; H01L 51/5284
See application file for complete search history.

(56) References Cited

U.S. PATENT DOCUMENTS

2010/0134710 A1* 6/2010 Ishitani ............. G02F 1/133514
349/106
2017/0255072 A1* 9/2017 Kaneko ................... G02F 1/137
(Continued)

OTHER PUBLICATIONS

English translation of Office Action issued in related Chinese Patent Application No. 202080014301.3, mailed on Feb. 27, 2024. 9 pages.
(Continued)

*Primary Examiner* — Jonathan Y Jung
(74) *Attorney, Agent, or Firm* — K&L Gates LLP

(57) ABSTRACT

According to one embodiment, a display device including a first substrate including a first pixel and a second pixel, a second substrate, a liquid crystal layer containing polymer and liquid crystal molecules, and a light emitting element, wherein the second pixel is located between the light emitting element and the first pixel, the first substrate includes a switching element including a semiconductor layer arranged in the first pixel, a pixel electrode, and a first light shielding portion arranged in the second pixel and being adjacent to the semiconductor layer, the first light shielding portion is located between the semiconductor layer and the light emitting element in planar view and located on a side closer to the first pixel than a center of the second pixel.

9 Claims, 21 Drawing Sheets

(56) References Cited

U.S. PATENT DOCUMENTS

2017/0261809 A1\* 9/2017 Mizuno ................. G02F 1/1334
2018/0157114 A1\* 6/2018 Park ...................... G02F 1/1309

OTHER PUBLICATIONS

English translation of Office Action issued in related Japanese Patent Application No. 2023-180909, mailed on Apr. 23, 2024. 4 pages.
Office Action issued in related Chinese Patent Application No. 202080014301.3, mailed on Jul. 13, 2024. 6 pages.

\* cited by examiner

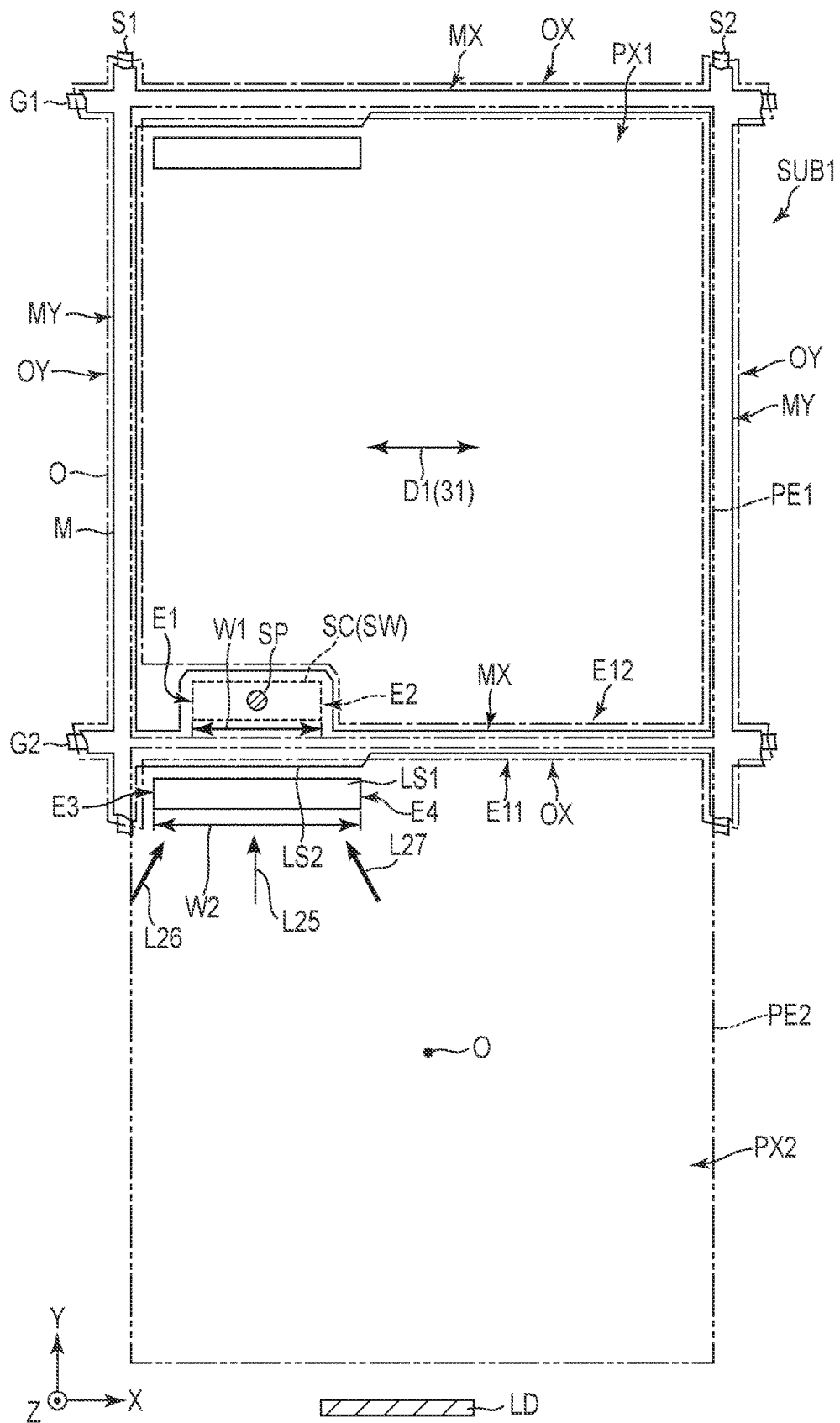
F I G. 2

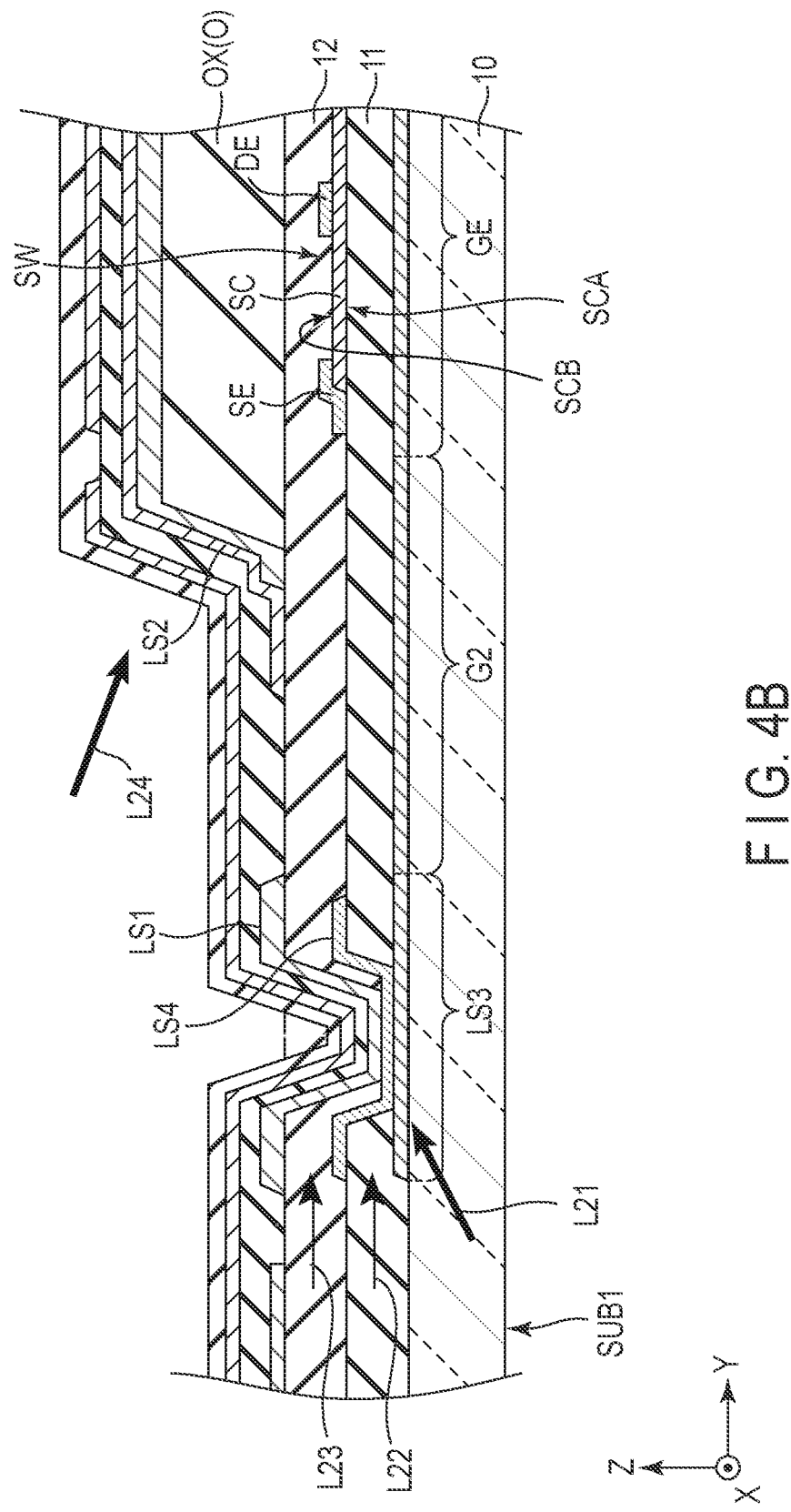
F I G. 4B

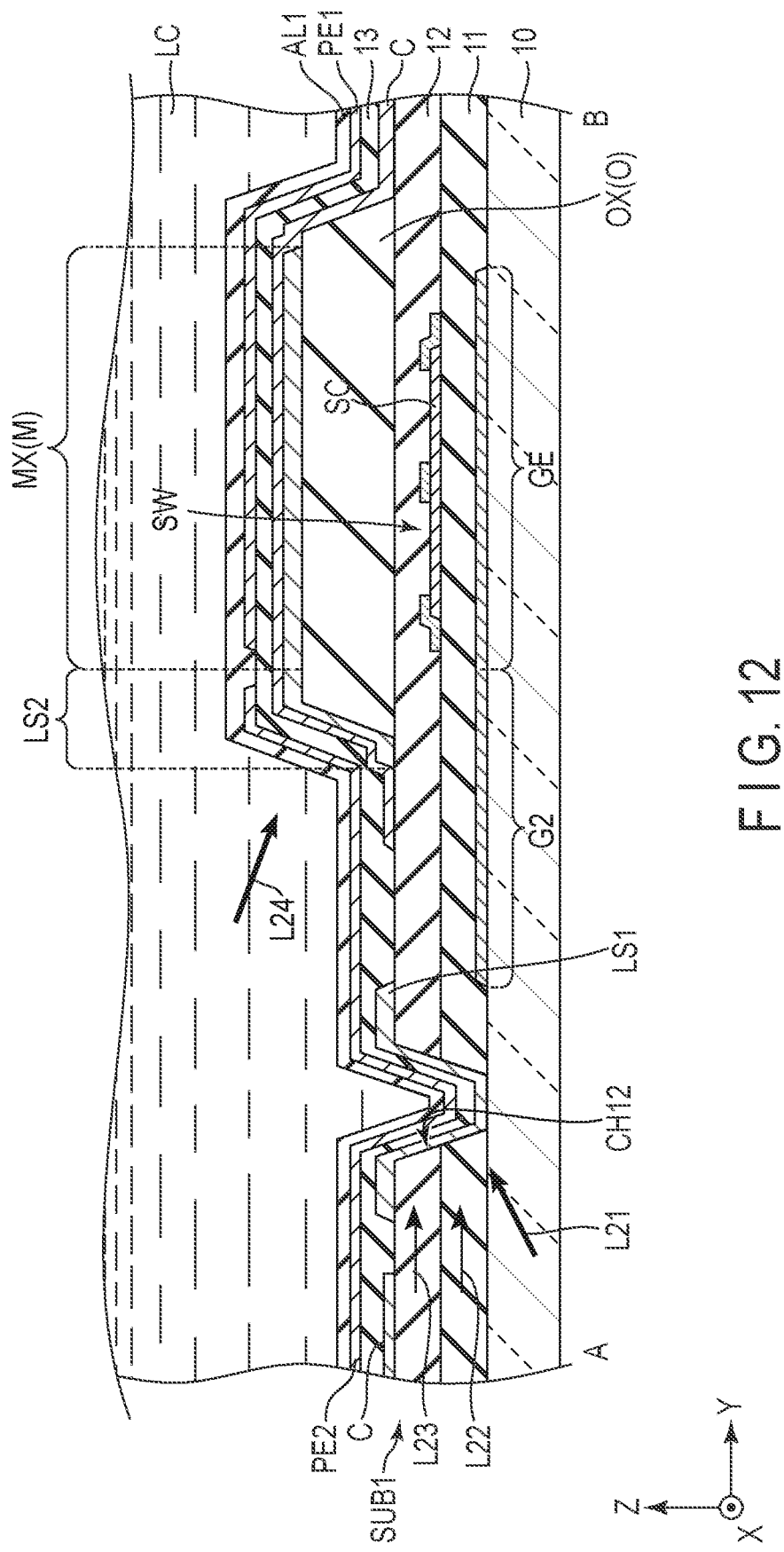
F I G. 12

F.I.G. 18

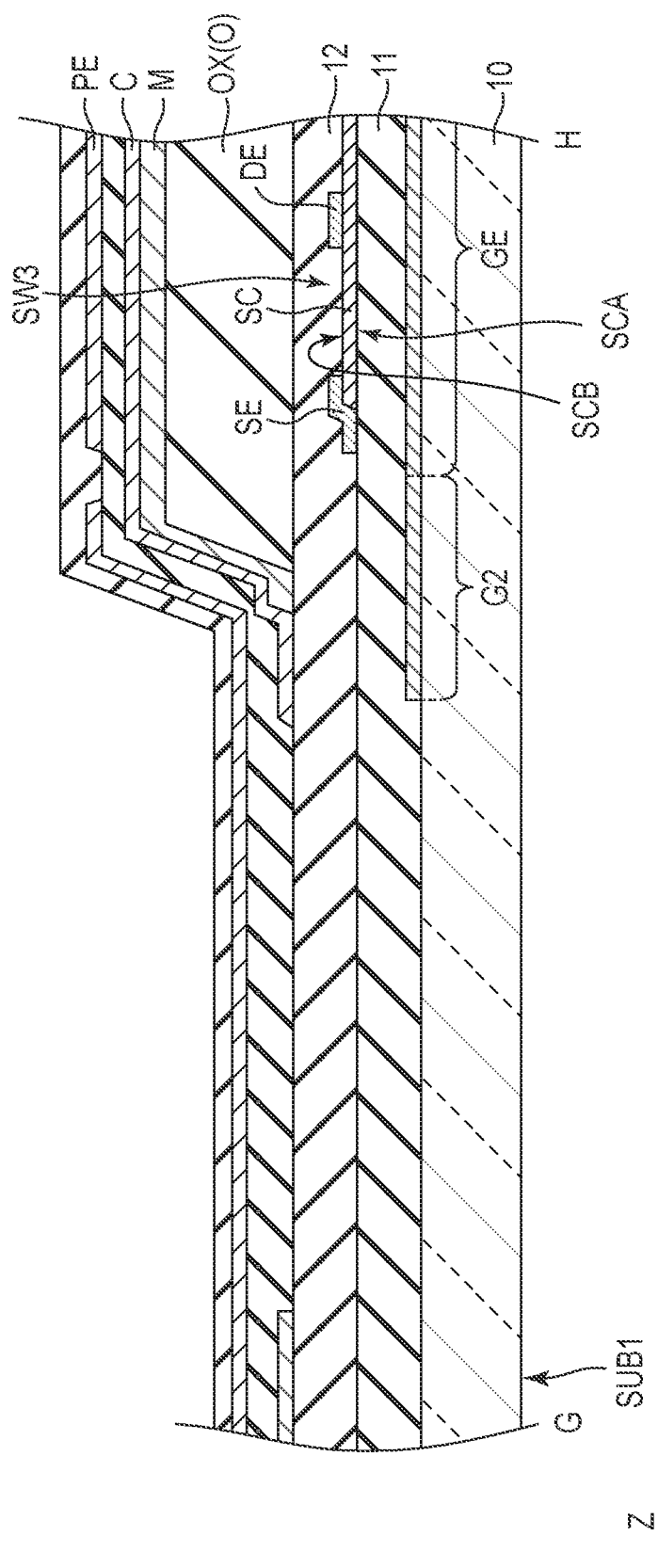
F I G. 19

US 12,265,308 B2

DISPLAY DEVICE

CROSS-REFERENCE TO RELATED APPLICATIONS

This application is a Continuation application of U.S. patent application Ser. No. 17/402,792 filed Aug. 16, 2021, which is a Continuation application of PCT Application No. PCT/JP2020/003032, filed Jan. 28, 2020 and based upon and claiming the benefit of priority from Japanese Patent Application No. 2019-024586, filed Feb. 14, 2019, the entire contents of all of which are incorporated herein by reference.

FIELD

Embodiments described herein relate generally to a display device.

BACKGROUND

In recent years, a display device using a polymer dispersed liquid crystal capable of switching a scattering state in which incident light is scattered and a transmissive state in which incident light is transmitted has been proposed. For example, a display device in which a reflective layer formed of aluminum, silver, or the like covers a pixel switching circuit unit has been disclosed.

SUMMARY

The present application relates generally to a display device.

According to one embodiment, a display device including a first substrate including a first pixel and a second pixel, a second substrate, a liquid crystal layer containing polymer and liquid crystal molecules, and a light emitting element, wherein the second pixel is located between the light emitting element and the first pixel, the first substrate includes a switching element including a semiconductor layer arranged in the first pixel, a pixel electrode, and a first light shielding portion arranged in the second pixel and being adjacent to the semiconductor layer, the first light shielding portion is located between the semiconductor layer and the light emitting element in planar view and located on a side closer to the first pixel than a center of the second pixel.

BRIEF DESCRIPTION OF THE DRAWINGS

FIG. 2 is a plan view showing main parts of the pixel PX on the first substrate SUB1 shown in FIG. 1.

FIG. 4B is an enlarged cross-sectional view showing main parts of the first substrate shown in FIG. 4A.

FIG. 12 is a cross-sectional view showing the first substrate SUB1 according to a fifth configuration example of the embodiments.

FIG. 19 is a cross-sectional view showing the first substrate SUB1 taken along line G-H shown in FIG. 18.

DETAILED DESCRIPTION

Figure 1:
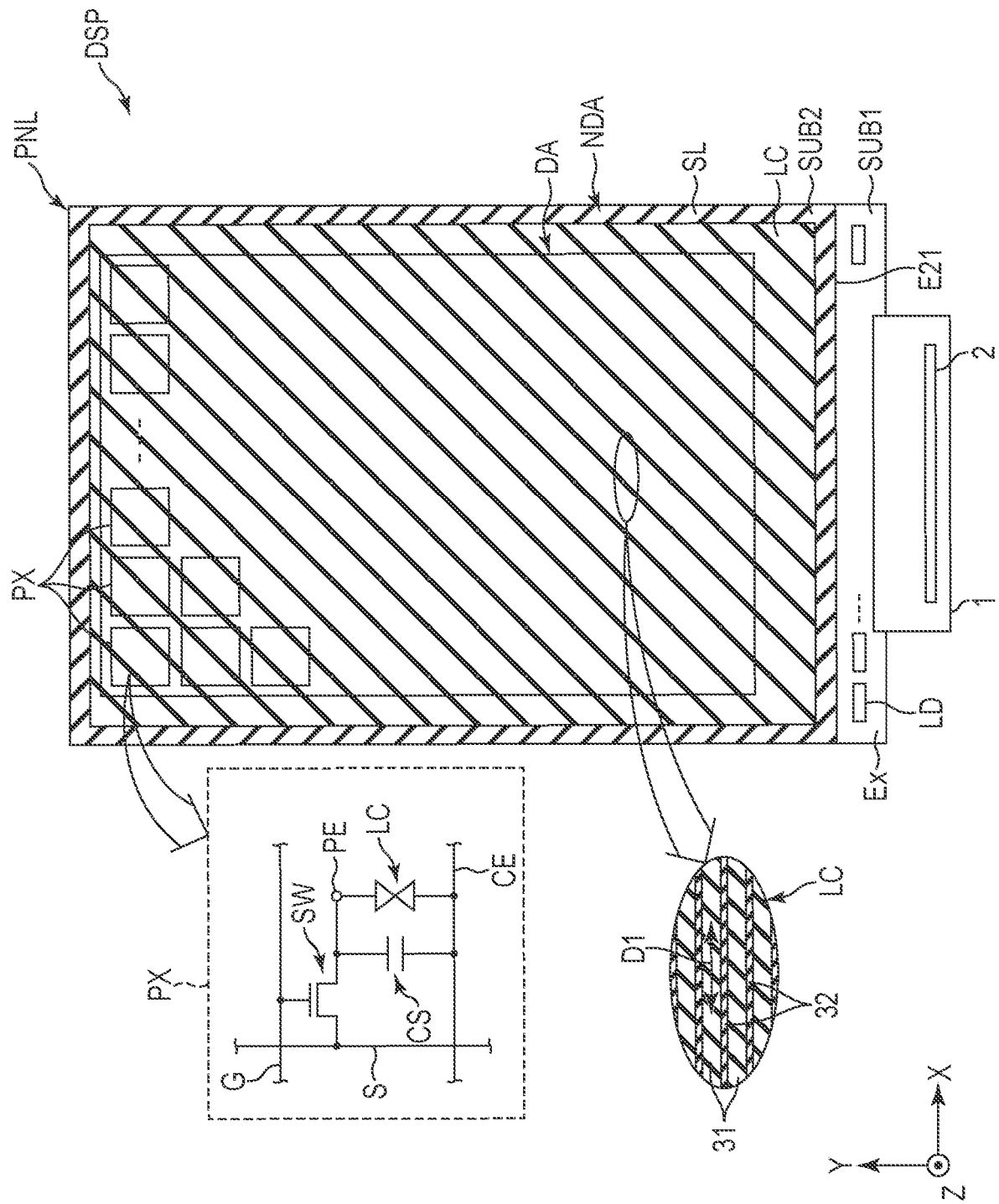
FIG. 1 is a plan view showing a display device DSP of the embodiments.

In general, according to one embodiment, a display device comprising, a first substrate comprising a first pixel and a second pixel, a second substrate, a liquid crystal layer located between the first substrate and the second substrate and containing polymer and liquid crystal molecules, and a light emitting element, wherein the second pixel is adjacent to the first pixel and located between the light emitting element and the first pixel, the first substrate comprises a switching element comprising a semiconductor layer arranged in the first pixel, a pixel electrode electrically connected to the switching element, and a first light shielding portion arranged in the second pixel and being adjacent to the semiconductor layer, the first light shielding portion is located between the semiconductor layer and the light emitting element in planar view and located on a side closer to the first pixel than a center of the second pixel.

According to another embodiment, a display device comprising, a first substrate, a second substrate, a liquid crystal layer located between the first substrate and the second substrate and containing polymer and liquid crystal molecules, and a light emitting element, wherein the first substrate comprises a switching element comprising a semiconductor layer, a pixel electrode electrically connected to the switching element, and a first light shielding portion adjacent to the semiconductor layer, the first light shielding portion is located between the semiconductor layer and the light emitting element in planar view, the first substrate comprises a transparent substrate, a first insulating film, and a second insulating film, which are stacked sequentially, the semiconductor layer is located between the first insulating film and the second insulating film in cross-sectional view, the first light shielding portion is provided in a through hole penetrating the first insulating film and the second insulating film.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First Configuration Example

FIG. 1 is a plan view showing a display device DSP of the embodiments. For example, the first direction X, the second direction Y, and the third direction Z are orthogonal to each other but may intersect at an angle other than 90 degrees. The first direction X and the second direction Y correspond to the directions parallel to a main surface of a substrate which configures the display device DSP, and the third direction Z corresponds to a thickness direction of the display device DSP. In the present specification, a direction from a first substrate SUB1 to a second substrate SUB2 is referred to as an upward direction (or, more simply, upwardly) and a direction from the second substrate SUB2 to the first substrate SUB1 is referred to as a downward direction (or, more simply, downwardly). According to "a second member on/above a first member" and "a second member under/below a first member", the second member may be in contact with the first member or may be remote from the first member. In addition, an observation position at which the display device DSP is observed is assumed to be located on the tip side of an arrow indicating the third direction Z, and viewing from the observation position toward an X-Y plane defined by the first direction X and the second direction Y is referred to as a planar view.

In the embodiments, a liquid crystal display device employing polymer dispersed liquid crystal will be described as an example of the display device DSP. The display device DSP comprises a display panel PNL, a wiring board 1, an IC chip 2, and a light emitting element LD.

The display panel PNL comprises a first substrate SUB1, a second substrate SUB2, a liquid crystal layer LC, and a seal SL. The first substrate SUB1 and the second substrate SUB2 are formed to be shaped in a flat plate parallel to the X-Y plane. The first substrate SUB1 and the second substrate SUB2 are overlaid in planar view. The first substrate SUB1 and the second substrate SUB2 are bonded to each other by the seal SL. The liquid crystal layer LC is held between the first substrate SUB1 and the second substrate SUB2, and is sealed by the seal SL. In FIG. 1, the liquid crystal layer LC and the seal SL are represented by different hatch lines.

As enlarged in FIG. 1, the liquid crystal layer LC comprises polymer dispersed liquid crystal containing polymer 31 and liquid crystal molecules 32. For example, the polymer 31 is liquid crystal polymer. The polymer 31 is formed in a stripe shape extending in one direction. For example, an extending direction D1 of the polymer 31 is a direction along the first direction X. The liquid crystal molecules 32 are dispersed in gaps of the polymer 31 and aligned such that their longer axes extend in the first direction X. The polymer 31 and the liquid crystal molecules 32 have optical anisotropy or refractive anisotropy. The response of the polymer 31 to the electric field is lower than the response of the liquid crystal molecules 32 to the electric field.

For example, the alignment orientation of the polymers 31 is hardly varied irrespective of the presence or absence of the electric field. In contrast, the alignment orientation of the liquid crystal molecules 32 is varied in accordance with the electric field in a state in which a voltage higher than or equal to a threshold value is applied to the liquid crystal layer LC. In a state in which no voltage is applied to the liquid crystal layer LC, optical axes of the polymer 31 and the liquid crystal molecules 32 are parallel to one another and the light made incident on the liquid crystal layer LC is transmitted without being substantially scattered in the liquid crystal layer LC (transparent state). In a state in which the voltage is applied to the liquid crystal layer LC, optical axes of the polymer 31 and the liquid crystal molecules 32 intersect one another and the light made incident on the liquid crystal layer LC is scattered in the liquid crystal layer LC (scattered state).

The display panel PNL comprises a display portion DA which displays an image and a non-display portion NDA in a frame shape surrounding the display portion DA. The seal SL is located in the non-display portion NDA. The display portion DA comprises pixels PX arrayed in a matrix in the first direction X and the second direction Y.

As shown and enlarged in FIG. 1, each pixel PX comprises a switching element SW, a pixel electrode PE, a common electrode CE, a liquid crystal layer LC, and the like. The switching element SW is configured by, for example, a thin-film transistor (TFT) and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. Each pixel electrode PE is opposed to the common electrode CE in the third direction Z, and drives the liquid crystal layer LC (particularly, the liquid crystal molecules 32) by an electric field produced between the pixel electrode PE and the common electrode CE. A capacitor CS is formed, for example, between an electrode having the same electric potential as the common electrode CE and an electrode having the same electric potential as the pixel electrode PE.

The wiring board 1 is electrically connected to an extended portion Ex of the first substrate SUB1. The wiring board 1 is a foldable flexible printed circuit board. The IC chip 2 is electrically connected to the wiring board 1. The IC chip 2 incorporates, for example, a display driver which outputs a signal necessary for image display, and the like. Incidentally, the IC chip 2 may be electrically connected to the extended portion Ex. The wiring board 1 and the IC chip 2 read signals from the display panel PNL in some cases, but mainly function as signal sources which supply signals to the display panel PNL.

The light emitting element LD is overlaid on the extended portion Ex. A plurality of light emitting elements LS are arranged in the first direction X at intervals. These light emitting elements LD are arranged along an end part E21 of the second substrate SUB2 and emit light toward the end part E21.

FIG. 2 is a plan view showing main parts of the pixel PX on the first substrate SUB1 shown in FIG. 1. The first substrate SUB1 comprises a first pixel PX1 and a second pixel PX2 as the pixels PX. The second pixel PX2 is adjacent to the first pixel PX1 in the second direction Y and is located between the light emitting element LD and the first pixel PX1. The first substrate SUB1 comprise scanning lines G1 and G2, a semiconductor layer SC, signal lines S1 and S2, an organic insulating film O, a metal line M, a first light shielding portion LS1, a second light shielding portion LS2, and pixel electrodes PE1 and PE2. The organic insulating film O is represented by a one-dot chain line, and the pixel electrodes PE1 and PE2 are represented by two-dot chain lines. The pixel electrode PE1 is arranged in the first pixel PX1, and the pixel electrode PE2 is arranged in the second pixel PX2.

The scanning lines G1 and G2 extend along the first direction X, and the signal lines S1 and S2 extend along the second direction Y. The pixel electrode PE1 arranged in the pixel PX is surrounded by two signal lines S1 and S2 arranged in the first direction X and two scanning lines G1 and G2 arranged in the second direction Y.

The semiconductor layer SC of the switching element SW arranged in the first pixel PX1 is arranged near an intersection of the scanning line G2 and the signal line S1. In the example shown in FIG. 2, the semiconductor layer SC extends in the first direction X. The semiconductor layer SC includes a first end part E1 close to the signal line S1 and a second end part E2 on a side opposite to the first end part E1. The semiconductor layer SC has a width W1. The width W1 corresponds to a distance from the first end part E1 to the second end part E2 in the first direction X (or a direction orthogonal to an arrangement direction (second direction Y) of the first pixels and the second pixels). The semiconductor layer is formed of, for example, amorphous silicon but may be formed of polycrystalline silicon or an oxide semiconductor.

The organic insulating film O is patterned and formed in a grating shape in planar view. The organic insulating film O is overlaid on each of the scanning lines G1 and G2, the semiconductor layer SC, and the signal lines S1 and S2. That is, the organic insulating film O comprises a first part OX and a second part OY. The first part OX is overlaid on the scanning lines G1 and G2. The second part OY is overlaid on the signal lines S1 and S2. The first part OX has a side surface E11 close to the light emitting element LD and a side surface E12 on a side opposite to the side surface E11. The side surface E11 and the side surface E12 extend along an extending direction D1 (or the first direction X) of the polymer 31.

The metal line M is arranged on the organic insulating film O and is formed in a grid shape in a planar view. The metal line M is overlaid on each of the scanning lines G1 and G2, the semiconductor layer SC, and the signal lines S1 and S2. That is, the metal line M comprises a first wiring part MX and a second wiring part MY. The first wiring part MX is overlaid on the scanning lines G1 and G2 and the first part OX. The second wiring part MY is overlaid on the signal lines S1 and S2 and the second part OY.

The first light shielding portion LS1 is located between the semiconductor layer SC and the light emitting element LD along the second direction Y and is adjacent to the semiconductor layer SC. The first light shielding portion LS1 is separated from the signal lines S1 and S2, the metal line M, and the organic insulating film O in planar view, and is formed in an island shape. In addition, the first light shielding portion LS1 is arranged in the second pixel PX2 and is overlaid on the pixel electrode PE2 in planar view. The first light shielding portion LS1 is located on a side closer to the first pixel PX1 (or the pixel electrode PE1) than a center O of the second pixel PX2 (or a center O of the pixel electrode PE2) in the second direction Y. Alternatively, the first light shielding portion LS1 is located between the center O of the second pixel PX2 and the semiconductor layer SC of the first pixel PX1, on the side close to the semiconductor layer SC.

The first light shielding portion LS1 extends along the first direction X. The first light shield LS1 has a third end part E3 close to the signal line S1 and a fourth end part E4 on a side opposite to the third end part E3. The first light shielding portion LS1 has a width W2. The width W2 corresponds to a distance from the third end part E3 to the fourth end part E4 in the first direction X (or a direction orthogonal to an arrangement direction (second direction Y) of the first pixels and the second pixels). The width W2 is larger than the width W1 of the semiconductor layer SC. In addition, the first end part E1 is farther from the signal line S1 than the third end part E3, and the second end part E2 is closer to the signal line S1 than the fourth end part E4, in the first direction X. That is, the semiconductor layer SC is provided such that the first end part E1 and the second end part E2 thereof are located between the third end part E3 and the fourth end part E4 in the first direction X.

The first light shielding portion LS1 is arranged in the same layer as the metal line M. In the present specification, the first member and the second member arranged in "the same layer" refer to those formed of the same material in the same process.

The second light shielding portion LS2 is located between the semiconductor layer SC and the first light shielding portion LS1 along the second direction Y and is overlaid on the side surface E11 of the first part OX. In the example shown in FIG. 2, the second light shielding portion LS2 is formed integrally with the first wiring part MX of the metal line M. In other words, the first wiring part MX partially extends to the side separated from the semiconductor layer SC (or extends to the light emitting element LD) and forms the second light shielding portion LS2 overlaid on the side face E11.

The spacer SP is provided at a position overlaid on the semiconductor layer SC. The spacer SP forms a predetermined cell gap between the first substrate SUB1 and the second substrate SUB2 shown in FIG. 1.

The pixel electrodes PE1 and PE2 are arranged in the second direction Y. In the vicinity of the scanning line G2 in the example shown in FIG. 2, the pixel electrode PE1 is overlaid on the semiconductor layer SC, and the pixel electrode PE2 is overlaid on the first light shielding portion LS1.

Figure 3:
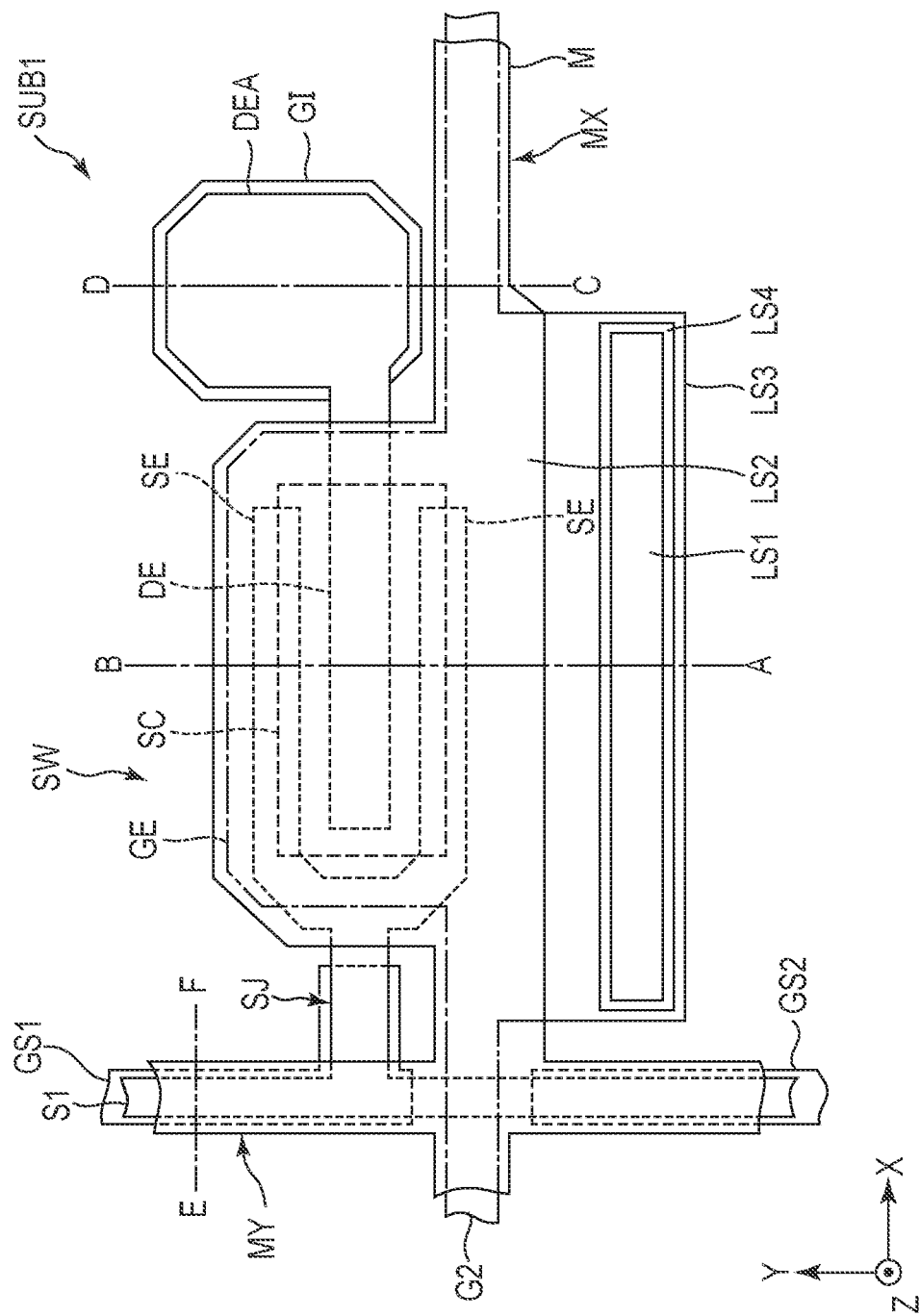
FIG. 3 is an enlarged plan view showing a periphery of the semiconductor layer SC shown in FIG. 2.

FIG. 3 is an enlarged plan view showing a periphery of the semiconductor layer SC shown in FIG. 2. A third light shielding portion LS3, and the gate electrode GE of the switching element SW are formed integrally with the scanning line G2. The semiconductor layer SC is overlaid on the gate electrode GE. The third light shielding portion LS3 extends towards the first light shielding portion LS1 and further to pass beyond the first light shielding portion LS1 to the side opposite to the gate electrode GE. Each of the first light shielding portion LS1 and the second light shielding portion LS2 is overlaid on the third light shielding portion LS3. The third light shielding portion LS3 is continuously formed between the first light shielding portion LS1 and the second light shielding portion LS2 without interruption. The fourth light shielding portion LS4 is overlaid on the first to third light shielding portions LS1 to LS3. The cross-sectional structures of the first to fourth light shielding portions LS1 to LS4 will be described in detail later.

Each of the light shielding layers GS1 and GS2 extends in the second direction Y. The scanning line G2 is located between the light shielding layers GS1 and GS2 and is separated from the light shielding layers GS1 and GS2. Each of the light shielding layers GS1 and GS2 is formed in an island shape.

The signal line S1 intersects the scanning line G2 and is overlaid on the light shielding layers GS1 and GS2. The source electrode SE of the switching element SW and the connection portion SJ are formed integrally with the signal line S1. The connection portion SJ connects the source electrode SE and the signal line S1 and is overlaid on the light shielding layer GS1. The source electrode SE is branched into two parts from a connection position of the connection portion SJ, and each of the parts extends in the first direction X and is overlaid on the semiconductor layer SC.

The drain electrode DE of the switching element SW is located between two source electrodes SE and is overlaid on the semiconductor layer SC. The drain electrode DE includes a connection portion DEA electrically connected to the pixel electrode PE1 shown in FIG. 2. The connection portion DEA is overlaid on the light shielding layer GI.

The metal line M is overlaid on the source electrode SE and is also overlaid on the drain electrode DE excluding the connection portion DEA.

Figure 4A:
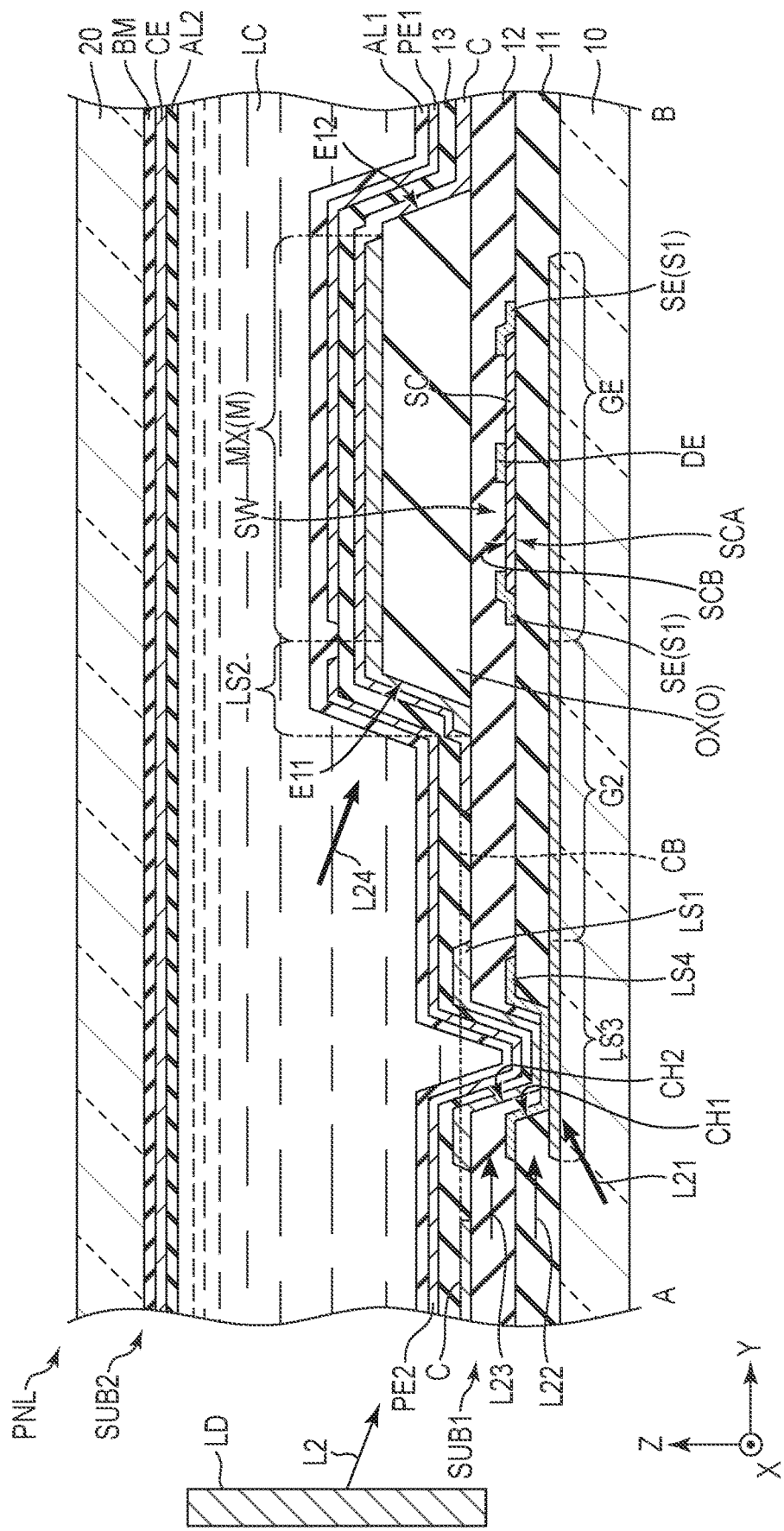
FIG. 4A is a cross-sectional view showing a display panel PNL taken along line A-B including first to fourth light shielding portions LS1 to LS4 shown in FIG. 3.

FIG. 4A is a cross-sectional view showing a display panel PNL taken along line A-B including first to fourth light shielding portions LS1 to LS4 shown in FIG. 3. The first substrate SUB1 further comprises a transparent substrate 10, insulating films 11 to 13, a capacitive electrode C, and an alignment film AL1. In the embodiments, the insulating film 11 corresponds to the first insulating film located on the transparent substrate 10, the insulating film 12 corresponds to the second insulating film located on the insulating film 11, and the organic insulating film O corresponds to the third insulating film located on the insulating film 12.

The gate electrode GE integrated with the scanning line G2 and the third light shielding portion LS3 are located between the transparent substrate 10 and the insulating film 11. In the example shown in FIG. 4A, the gate electrode GE and the third light shielding portion LS3 are in contact with the transparent substrate 10, but other insulating films may be interposed between the gate electrode GE and the third light shielding portion LS3, and the transparent substrate 10.

The semiconductor layer SC is located between the insulating film 11 and the insulating film 12, directly above the gate electrode GE. A lower surface SCA of the semiconductor layer SC is in contact with the insulating film 11. Two source electrodes SE integrated with the signal line S1 are in contact with an upper surface SCB of the semiconductor layer SC, and some of them are located on the insulating film 11. The drain electrode DE is in contact with the upper surface SCB of the semiconductor layer SC. The insulating film 12 covers the source electrode SE and the drain electrode DE and is in contact with the upper surface SCB of the semiconductor layer SC.

At least part of the fourth light shielding portion LS4 is provided in a through hole CH1 that penetrates the insulating film 11 to the third light shielding portion LS3, and is in contact with the third light shielding portion LS3. The fourth light shielding portion LS4 is separated from each of the signal line S1, the source electrode SE, and the drain electrode DE.

At least part of the first light shielding portion LS1 is provided in a through hole CH2 that penetrates the insulating film 12 to the fourth light shielding portion LS4, and is in contact with the fourth light shielding portion LS4. The through hole CH2 is provided to be overlaid on the through hole CH1. For this reason, the first light shielding portion LS1 is provided to be overlaid on the through holes CH1 and CH2. In addition, in a region where the through holes CH1 and CH2 are overlaid, the third light shielding portion LS3, the fourth light shielding portion LS4, and the first light shielding portion LS1 are overlaid in this order along the third direction Z. That is, the first light shielding portion LS1 is electrically connected to the third light shielding portion LS3 integrated with the scanning line G2, via the fourth light shielding portion LS4. For this reason, the electric potential of the first light shielding portion LS1 is the same as that of the scanning line G2.

The fourth light shielding portion LS4 is arranged in the same layer as the signal line S1, the source electrode SE, and the drain electrode DE.

A first part OX of the organic insulating film O is overlaid on the switching element SW. A side surface E11 of the first part OX is located between the through hole CH1 and the semiconductor layer SC along the second direction Y. The first wiring part MX of the metal line M is overlaid on the first part OX. The second light shielding portion LS2 covers the side surface E11 and is in contact with the insulating film 12.

The capacitive electrode C directly covers the first wiring part MX and is electrically connected to the first wiring part MX. In addition, the capacitive electrode C directly covers the second light shielding portion LS2 and is electrically connected to the second light shielding portion LS2. For this reason, the electric potential of the second light shielding portion LS2 is the same as that of the capacitive electrode. In addition, the capacitive electrode C covers a side surface E12 of the first part OX. In addition, the capacitive electrode C is in contact with the insulating film 12 in a region that is not overlaid on the organic insulating film O. The first light shielding portion LS1 is provided in an opening portion CB of the capacitive electrode C. For this reason, the first light shielding portion LS1 is electrically insulated from the capacitive electrode C. In addition, the first light shielding portion LS1 and the second light shielding portion LS2 are electrically insulated from each other.

The insulating film 13 covers the capacitive electrode C and the first light shielding portion LS1. The insulating film 13 is in contact with the insulating film 12 between the capacitive electrode C and the first light shielding portion LS1, in the opening portion CB. The pixel electrodes PE1 and PE2 are located on the insulating film 13. Each of the pixel electrodes PE1 and PE2 faces the capacitive electrode C via the insulating film 13 in the third direction Z, and forms a storage capacitance required for pixel display in the pixel PX. The first alignment film AL1 covers the insulating film 13 and the pixel electrodes PE1 and PE2. The alignment film AL1 is in contact with the insulating film 13 between the pixel electrode PE1 and the pixel electrode PE2.

The second substrate SUB2 comprises a transparent substrate 20, a light shielding layer BM, a common electrode CE, and an alignment film AL2. The light shielding layer BM is located just above each of the scanning line G2, the switching element SW, the first light shielding portion LS1 and the second light shielding portion LS2. The common electrode CE is located between the light shielding layer BM and the alignment film AL2. The electric potential of the common electrode CE is the same as that of the capacitive electrode C.

The liquid crystal layer LC is located between the first substrate SUB1 and the second substrate SUB2 and is in contact with each of the alignment films AL1 and AL2.

The transparent substrates 10 and 20 are insulating substrates such as glass substrates or plastic substrates. The insulating films 11 to 13 are formed of, for example, a transparent inorganic insulating material such as silicon nitride or silicon oxide. The organic insulating film O is formed of, for example, a transparent organic insulating material such as acrylic resin.

The scanning line G, the signal line S, and the metal line M are formed of an opaque metal material such as molybdenum, aluminum, tungsten, titanium, or silver. The first light shielding portion LS1 and the second light shielding portion LS2 are formed of the same material as the metal line M. The third light shielding portion LS3 is formed of the same material as the scanning line G. The fourth light shielding portion LS4 is formed of the same material as the signal line S.

The capacitive electrode C, the pixel electrodes PE, and the common electrode CE are transparent electrodes formed of a transparent conductive material such as indium tin oxide (ITO) or indium zinc oxide (IZO). The light shielding layer BM may be, for example, an insulating layer or a conductive layer having lower resistance than the common electrode CE. When the light shielding layer BM is a conductive layer, the common electrode CE is electrically connected to the light shielding layer BM such that the resistance of the common electrode CE is lowered.

The alignment films AL1 and AL2 are horizontal alignment films having an alignment restriction force substantially parallel to the X-Y plane. For example, the alignment films AL1 and AL2 are subjected to alignment treatment in the first direction X. Incidentally, the alignment treatment may be a rubbing treatment or an optical alignment treatment.

Figure 7:
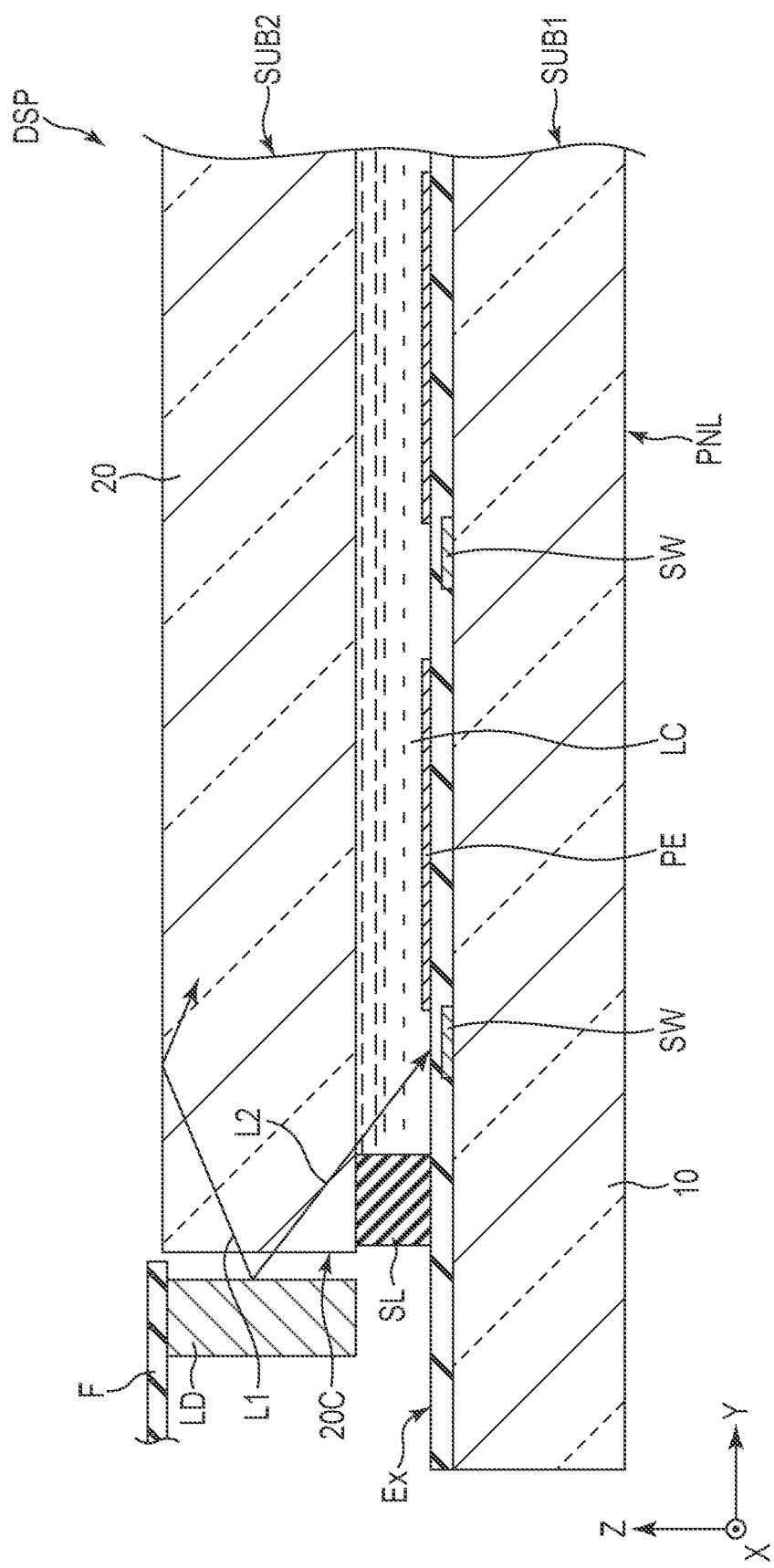
FIG. 7 is a cross-sectional view showing a configuration example of the display device DSP of the embodiments.

A cross-sectional view showing a configuration example of the display device DSP according to the embodiments will be described with reference to FIG. 7. Only main parts of the display panel PNL are shown.

The light emitting element LD faces a side surface 20C of the transparent substrate 20 in the second direction Y. The side surface 20C corresponds to the end part E21 of the second substrate SUB2 shown in FIG. 1. The light emitting element LD is electrically connected to a wiring board F. The light emitting element LD is, for example, a light emitting diode and comprises a red light emitting portion, a green light emitting portion, and a blue light emitting portion, which are not described in detail. Incidentally, a transparent light guide may be arranged between the light emitting element LD and the side surface 20C.

Next, light L1 emitted from the light emitting element LD will be described with reference to FIG. 7.

The light emitting element LD emits the light L1 toward the side surface 20C. The light L1 emitted from the light emitting element LD travels along a direction of an arrow indicating the second direction Y and is made incident on the transparent substrate 20 from the side surface 20C. The light L1 incident on the transparent substrate 20 travels inside the display panel PNL while being repeatedly reflected.

The light L1 incident on the liquid crystal layer LC to which no voltage is applied is transmitted through the liquid crystal layer LC without being substantially scattered. In addition, the light L1 incident on the liquid crystal layer LC to which a voltage is applied is scattered by the liquid crystal layer LC. The display device DSP can be observed not only from the first substrate SUB1 side, but also from the second substrate SUB2 side. In addition, the display device DSP can observe the background of the display device DSP via the display device DSP regardless of whether the display device DSP is observed from the first substrate SUB1 side or the second substrate SUB2 side.

Light L2 traveling toward the switching element SW, of the light emitted from the light emitting element LD, will be reviewed. When the light L2 traveling toward the switching element SW, of the light traveling inside the display panel PN, is made incident on the semiconductor layer SC, carriers are generated by photoexcitation in the semiconductor layer SC and a leak current in the switching element SW increases. When the leak current increases, the electric potential held in the pixel PX changes largely, which may cause deterioration in display quality.

According to the embodiments, as shown in FIG. 4B, light L21 propagating through the transparent substrate 10, of the light traveling toward the switching element SW, is shielded by the third light shielding portion LS3, the scanning line G2, and the gate electrode GE. Light L22 propagating through the insulating film 11 is shielded by the third light shielding portion LS3 and the fourth light shielding portion LS4. Light L23 propagating through the insulating film 12 is shielded by the first light shielding portion LS1 and the fourth light shielding portion LS4. Light L24 traveling toward the first part OX of the organic insulating film O is shielded by the second light shielding portion LS2. Therefore, the light L2 can hardly reach the lower surface SCA and the upper surface SCB of the semiconductor layer SC.

In addition, as shown in FIG. 2, since the semiconductor layer SC is provided to be located between the third end part E3 and the fourth end part E4 of the first light shielding portion LS1, not only light L25 traveling straight ahead along the second direction Y, but also light L26 and L27 traveling in a direction inclined with respect to the second direction Y in planar view are shielded.

Accordingly, it is possible to suppress the generation of the leak current in the semiconductor layer SC can be suppressed, and the deterioration of the display quality such as the deterioration of the luminance due to variation of the electric potential of the pixel PX can be suppressed.

In addition, the first to fourth light shielding portions LS1 to LS4 can be formed of a material having a higher reflectance than the light shielding layer formed of black resin. According to the first to fourth light shielding portions LS1 to LS4 formed of such a material having high reflectance, absorption of the light traveling through the display panel can be suppressed, and degradation of use efficiency of the light from the light emitting element LD can be suppressed.

In addition, even if undesired scattering occurs in the first to fourth light shielding portions LS1 to LS4, the scattered light is shielded by the light shielding layer BM of the second substrate SUB2. Deterioration in display quality can be therefore suppressed.

Figure 5:
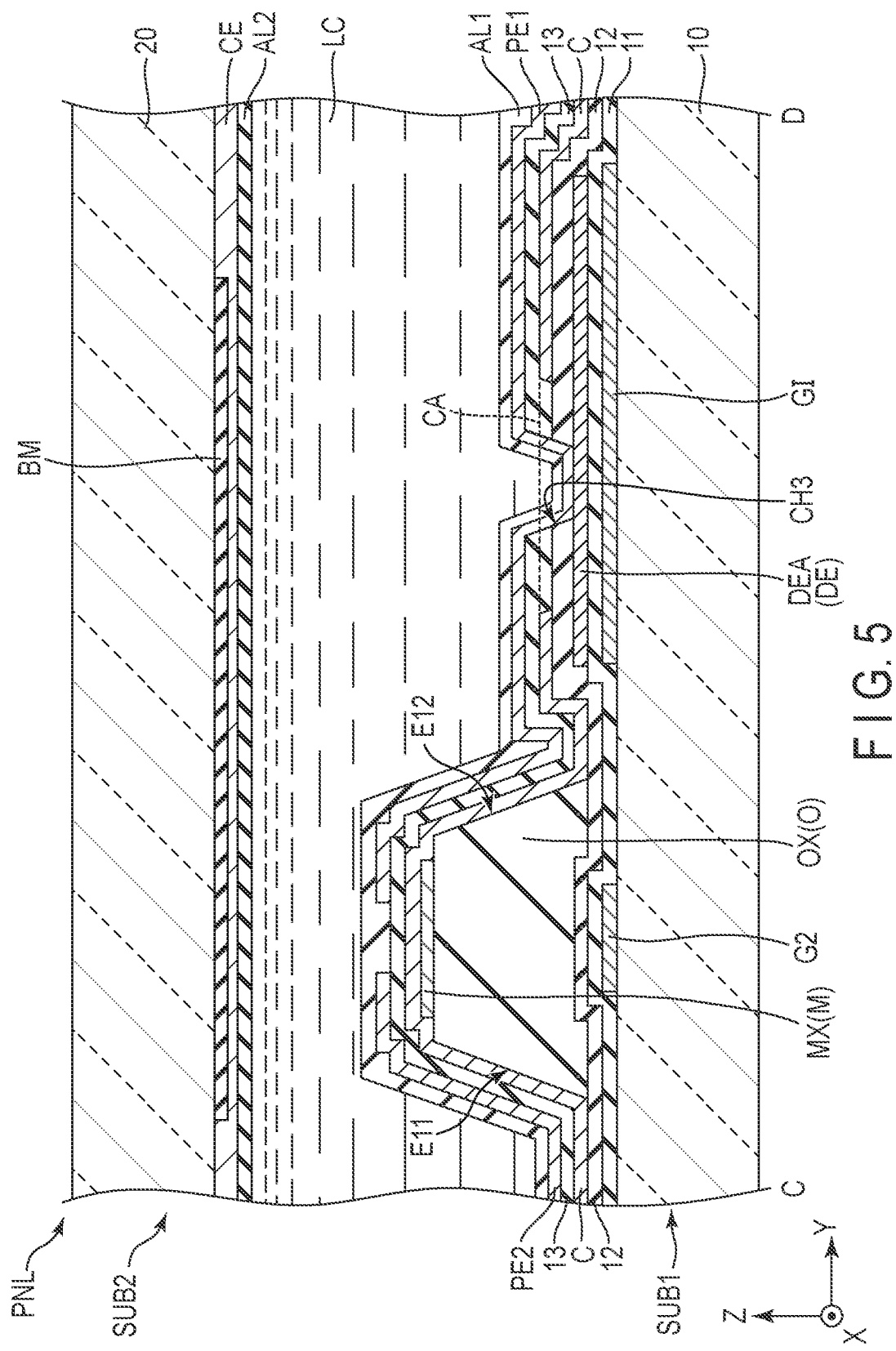
FIG. 5 is a cross-sectional view showing the display panel PNL taken along line C-D including the scanning line G2 and the connection portion DEA shown in FIG. 3.

FIG. 5 is a cross-sectional view showing the display panel PNL taken along line C-D including the scanning line G2 and the connection portion DEA shown in FIG. 3.

In the first substrate SUB1, the light shielding layer GI is arranged in the same layer as the scanning line G2, is located on the transparent substrate 10, and is formed of the same material as the scanning line G2. The scanning line G2 and the light shielding layer GI are covered with the insulating film 11. The connection portion DEA is located on the insulating film 11 immediately above the light shielding layer GI and is covered with the insulating film 12. The first part OX of the organic insulating film O is located on the insulating film 12 just above the scanning line G2. The first wiring part MX of the metal line M is located on the first part OX just above the scanning line G2. The capacitive electrode C covers the side surfaces E11 and E12 of the first part OX. At least part of the pixel electrode PE1 is provided in a through hole CH3 penetrating the insulating films 12 and 13 and an opening portion CA of the capacitive electrode C, and is in contact with the connection portion DEA.

In the second substrate SUB2, the light shielding layer BM is located just above each of the first part OX and the connection portion DEA.

Figure 6:
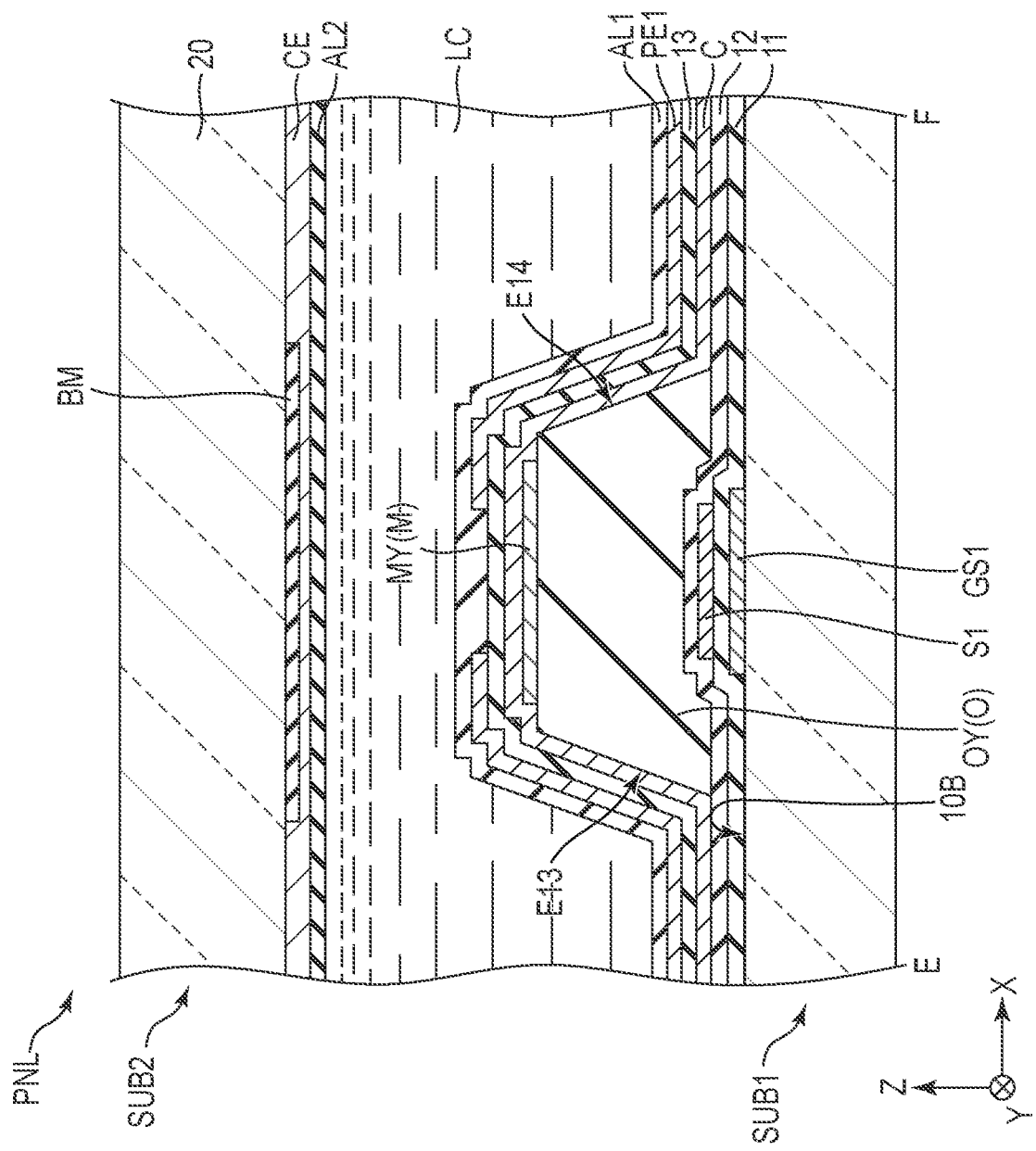
FIG. 6 is a cross-sectional view showing the display panel PNL taken along line E-F including the signal line S1 shown in FIG. 3.

FIG. 6 is a cross-sectional view showing the display panel PNL taken along line E-F including the signal line S1 shown in FIG. 3.

In the first substrate SUB1, the light shielding layer GS1 is located on the transparent substrate 10 and covered with the insulating film 11. The signal line S1 is located on the insulating film 11 just above the light shielding layer GS1 and covered with the insulating film 12. The second part OY of the organic insulating film O is located on the insulating film 12 just above the signal line S1. The second wiring part MY of the metal line M is located on the second portion OY just above the signal line S1. The capacitive electrode C is in contact with the second wiring part MY and covers side surfaces E13 and E14 of the second part OY.

In the second substrate SUB2, the light shielding layer BM is located just above the second part OY.

Simulation for verifying the effects of the embodiments will be described. In this simulation, a voltage different from the electric potential Vcom of the common electrode CE is applied to the pixel electrode PE, and the luminance of the pixel PX in the scattered state is calculated. In the calculated luminance, the luminance reduction rate is defined as {1−(La/Lb)} where the luminance immediately after the rise is La and the luminance immediately before the fall is Lb.

Figure 8:
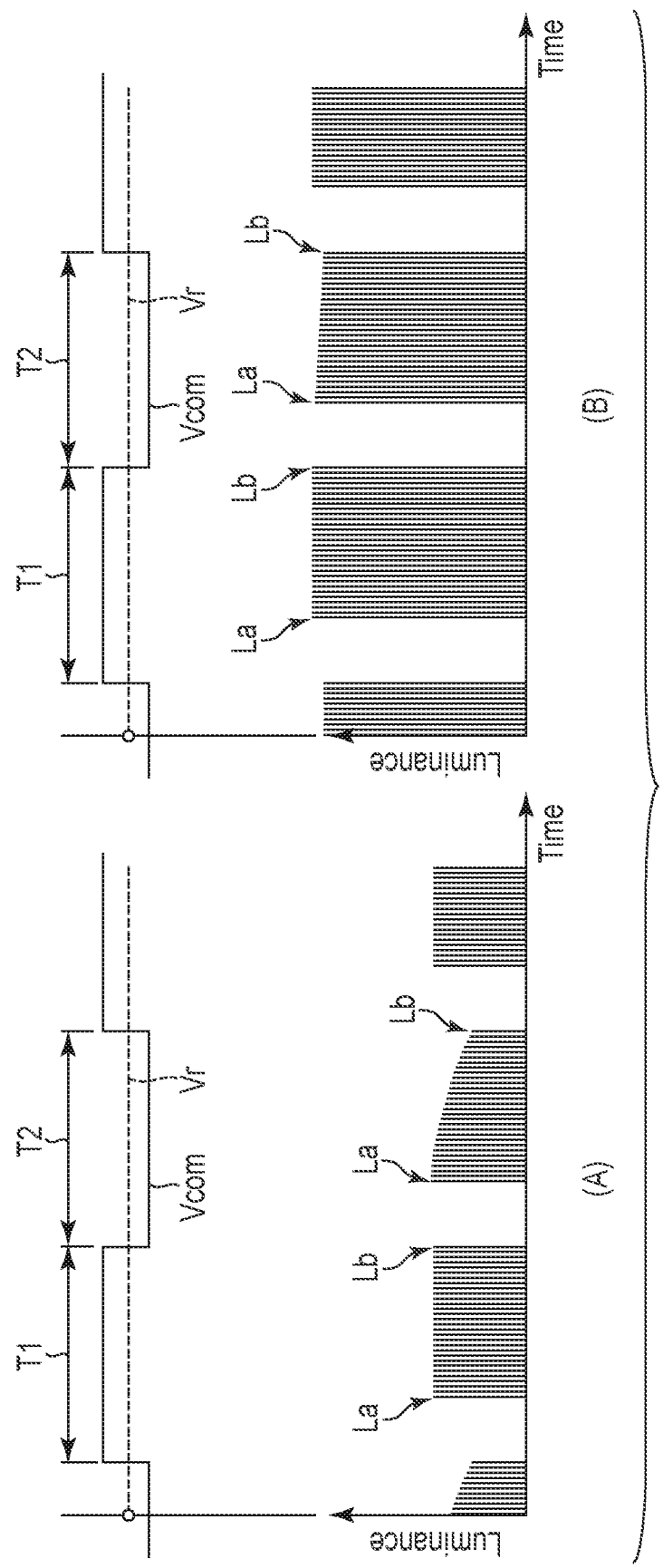
FIG. 8 is a chart showing a simulation result.

FIG. 8 is a chart showing a simulation result. (A) of FIG. 8 shows a simulation result in a configuration of a comparative example, and (B) of FIG. 8 shows a simulation result in the configuration of the embodiments. The display panel of the comparative example does not comprise the first to fourth light shielding portions shown in FIG. 4A. The display panel of the embodiments comprises the first to fourth light shielding portions shown in FIG. 4A.

In a period T1 in which an electric potential Vcom is positive with respect to a reference potential Vr, the luminance reduction rate was 1.34% in the comparative example, whereas the luminance reduction rate was 0.69% in the embodiments. In a period T2 in which the electric potential Vcom is negative with respect to the reference potential Vr, the luminance reduction rate was 10.7% in the comparative example, whereas the luminance reduction rate was 3.8% in the embodiments. It was thus confirmed that according to the embodiments, the reduction in luminance can be suppressed.

Next, another configuration example will be described.

Second Configuration Example

Figure 9:
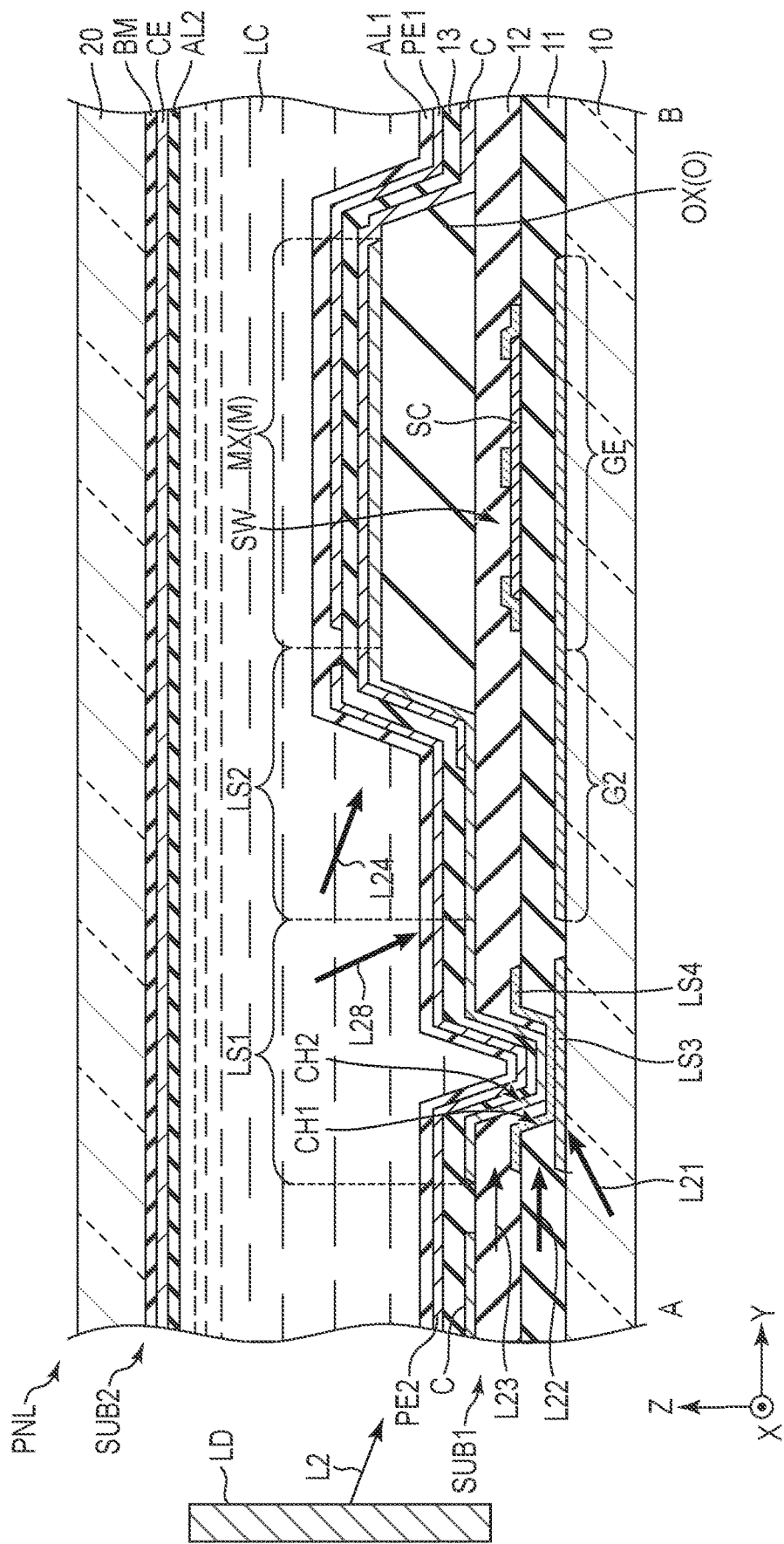
FIG. 9 is a cross-sectional view showing the display panel PNL according to a second configuration example of the embodiments.

FIG. 9 is a cross-sectional view showing the display panel PNL according to a second configuration example of the embodiments. A feature of the second configuration example shown in FIG. 9 is different from a feature of the first configuration example shown in FIG. 4A in that the first light shielding portion LS1 and the second light shielding portion LS2 are integrally formed and that the third light shielding portion LS3 is separated from the scanning line G2. In addition, the first light shielding portion LS1 and the second light shielding portion LS2 are formed integrally with the metal line M. In such a second configuration example, the first to fourth light shielding portions LS1 to LS4 are electrically connected to the metal line M and the capacitive electrode C. For this reason, the electric potentials of the first to fourth light shielding portions LS1 to LS4 are equal to each other and are the same as those of the metal line M and the capacitive electrode C.

In the second configuration example, too, the same advantages as those of the first configuration example can be obtained. Furthermore, light L28 traveling from the liquid crystal layer LC to the insulating film 12 can be shielded between the first light shielding portion LS1 and the second light shielding portion LS2.

Third Configuration Example

Figure 10:
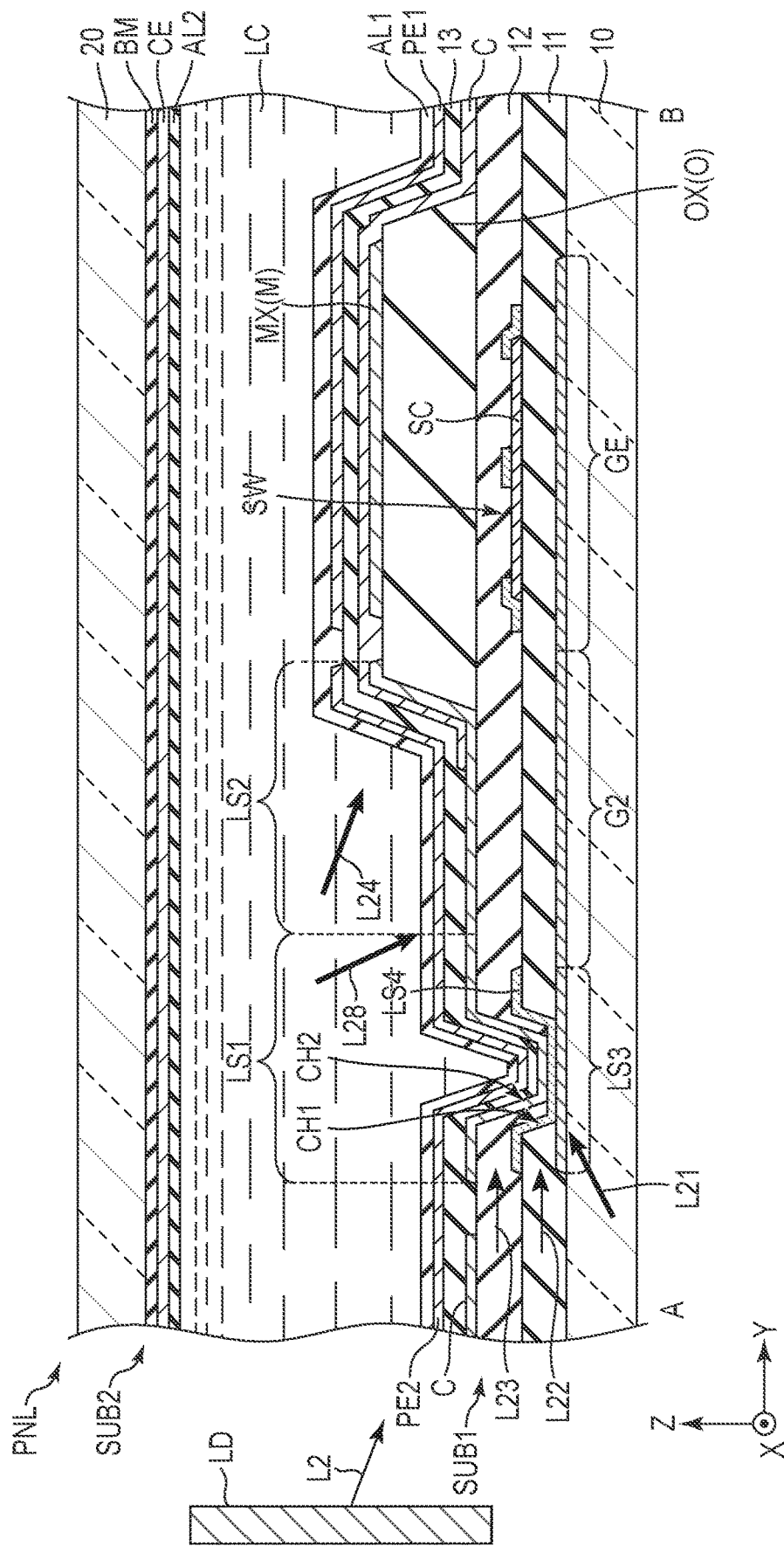
FIG. 10 is a cross-sectional view showing the display panel PNL according to a third configuration example of the embodiments.

FIG. 10 is a cross-sectional view showing the display panel PNL according to a third configuration example of the embodiments. A feature of the third configuration example shown in FIG. 10 is different from a feature of the first configuration example shown in FIG. 4A in that the first light shielding portion LS1 and the second light shielding portion LS2 are integrally formed and that the second light shielding portion LS2 is separated from the metal line M. The capacitive electrode C is in contact with the second light shielding portion LS2 and the metal line M. In such a third configuration example, the first to fourth light shielding portions LS1 to LS4 are electrically connected to the scanning line G2. For this reason, the electric potentials of the first light shielding portions LS1 to LS4 are the same as each other and are the same as the electric potential of the scanning line G2.

In the third configuration example, too, the same advantages as those of the second configuration example can be obtained.

Fourth Configuration Example

Figure 11:
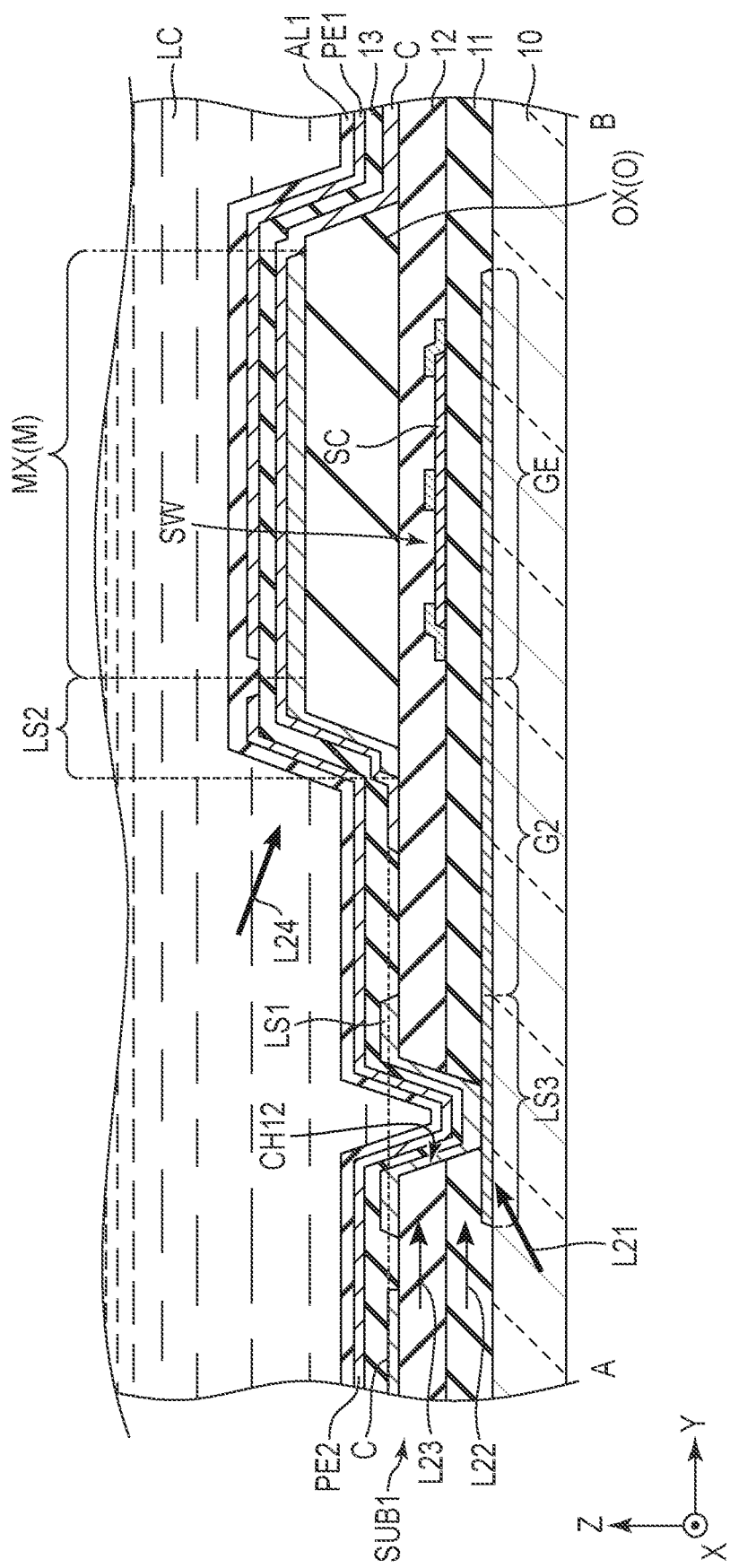
FIG. 11 is a cross-sectional view showing the first substrate SUB1 according to a fourth configuration example of the embodiments.

FIG. 11 is a cross-sectional view showing the first substrate SUB1 according to a fourth configuration example of the embodiments. A feature of the fourth configuration example shown in FIG. 11 is different from a feature of the first configuration example shown in FIG. 4A in that the fourth light shielding portion LS4 is not formed. At least part of the first light shielding portion LS1 is provided in a through hole CH12 that penetrates the insulating films 11 and 12 to the third light shielding portion LS3 and is in contact with the third light shielding portion LS3.

In such a fourth configuration example, too, the light L21 propagating through the transparent substrate 10, the light L22 propagating through the insulating film 11, and the light L23 propagating through the insulating film 12 are shielded by the first light shielding portion LS1 and the third light shielding portion LS3. For this reason, the same advantages as those of the above-described first structure example can be obtained.

Incidentally, the fourth configuration example in which the fourth light shielding portion LS4 is omitted can be applied to each of the second configuration example shown in FIG. 9 and the third configuration example shown in FIG. 10.

Fifth Configuration Example

FIG. 12 is a cross-sectional view showing the first substrate SUB1 according to a fifth configuration example of the embodiments. A feature of the fifth configuration example shown in FIG. 12 is different from a feature of the first configuration example shown in FIG. 4A in that the third light shielding portion LS3 and the fourth light shielding portion LS4 are omitted. The first light shielding portion LS1 is provided in the through hole CH12 that penetrates the insulating films 11 and 12 to the transparent substrate 10.

In such a fifth configuration example, too, the light L21 propagating through the transparent substrate 10, the light L22 propagating through the insulating film 11, and the light L23 propagating through the insulating film 12 are shielded by the first light shielding portion LS1. For this reason, the same advantages as those of the above-described first structure example can be obtained.

Incidentally, the fifth configuration example in which the third light shielding portion LS3 and the fourth light shielding portion LS4 are omitted can be applied to each of the second configuration example illustrated in FIG. 9 and the third configuration example illustrated in FIG. 10.

Sixth Configuration Example

Figure 13:
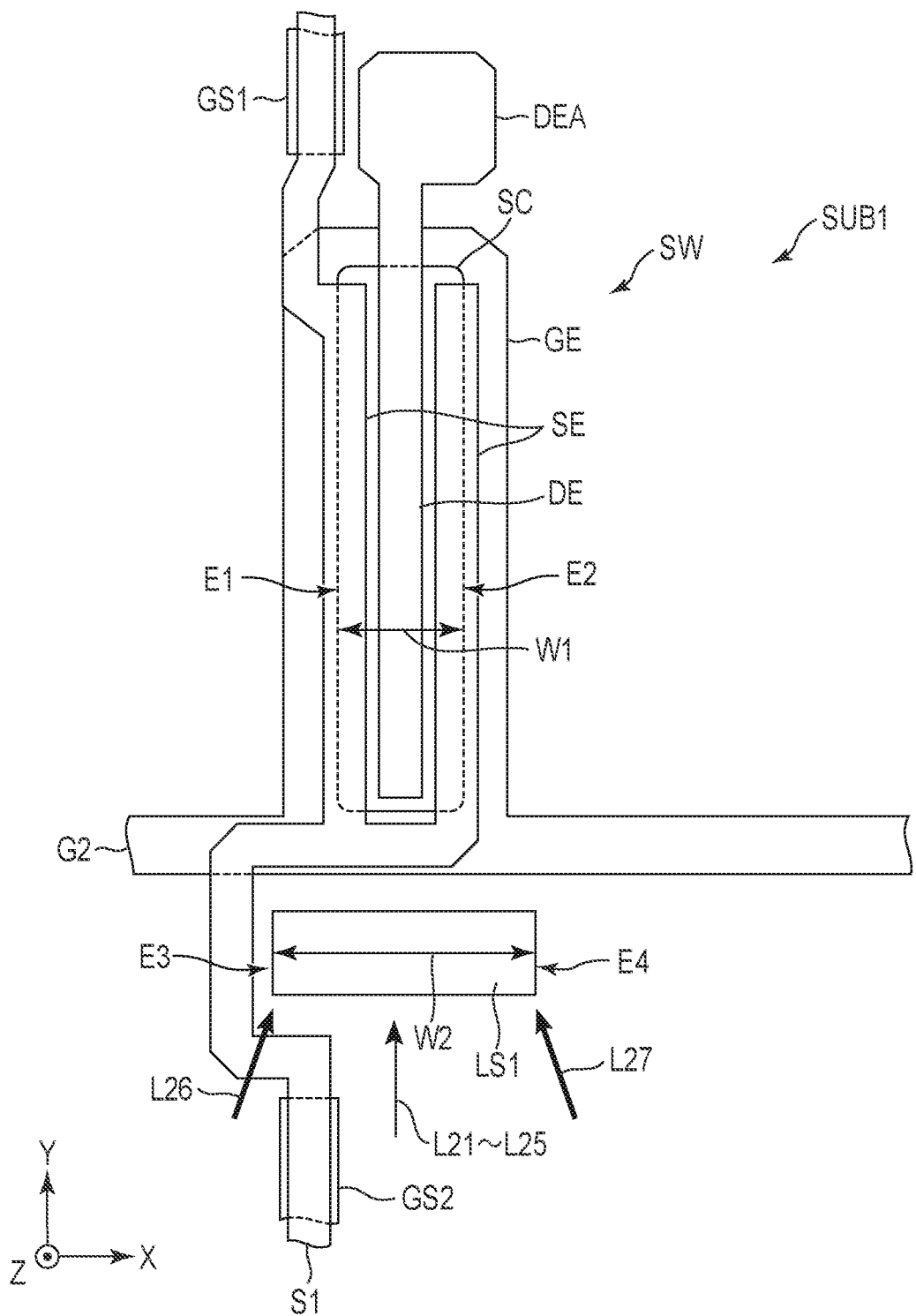
FIG. 13 is a plan view showing the first substrate SUB1 according to a sixth configuration example of the embodiments.

FIG. 13 is a plan view showing the first substrate SUB1 according to a sixth configuration example of the embodiments. A feature of the sixth configuration example shown in FIG. 13 is different from a feature of the first configuration example shown in FIG. 3 in that the semiconductor layer SC extends in the second direction Y. In FIG. 13, the scanning line G2, the signal line S2, the switching element SW, and the first light shielding portion LS1 are illustrated, and other constituent elements are omitted. The first light shielding portion LS1 is separated from the signal line S1, the source electrode SE, and the drain electrode DE. The width W2 of the first light shielding portion LS1 is larger than the width W1 of the semiconductor layer SC. In addition, the semiconductor layer SC is provided such that the first end part E1 and the second end part E2 thereof are located between the third end part E3 and the fourth end part E4 in the first direction X. The signal line S1 is bent to be separated from the third end part E3 of the first light shielding portion LS1. Alternatively, at least one of the third light shielding portion LS3 and the fourth light shielding portion LS4 may be arranged in the portion overlaid on the first light shielding portion LS1, similarly to the above-described configuration examples. Alternatively, the second light shielding portion LS2 may be arranged between the first light shielding portion LS1 and the semiconductor layer SC.

In such a sixth configuration example, too, the light L21 to L27 can be shielded similarly to the above-described configuration examples.

Seventh Configuration Example

Figure 14:
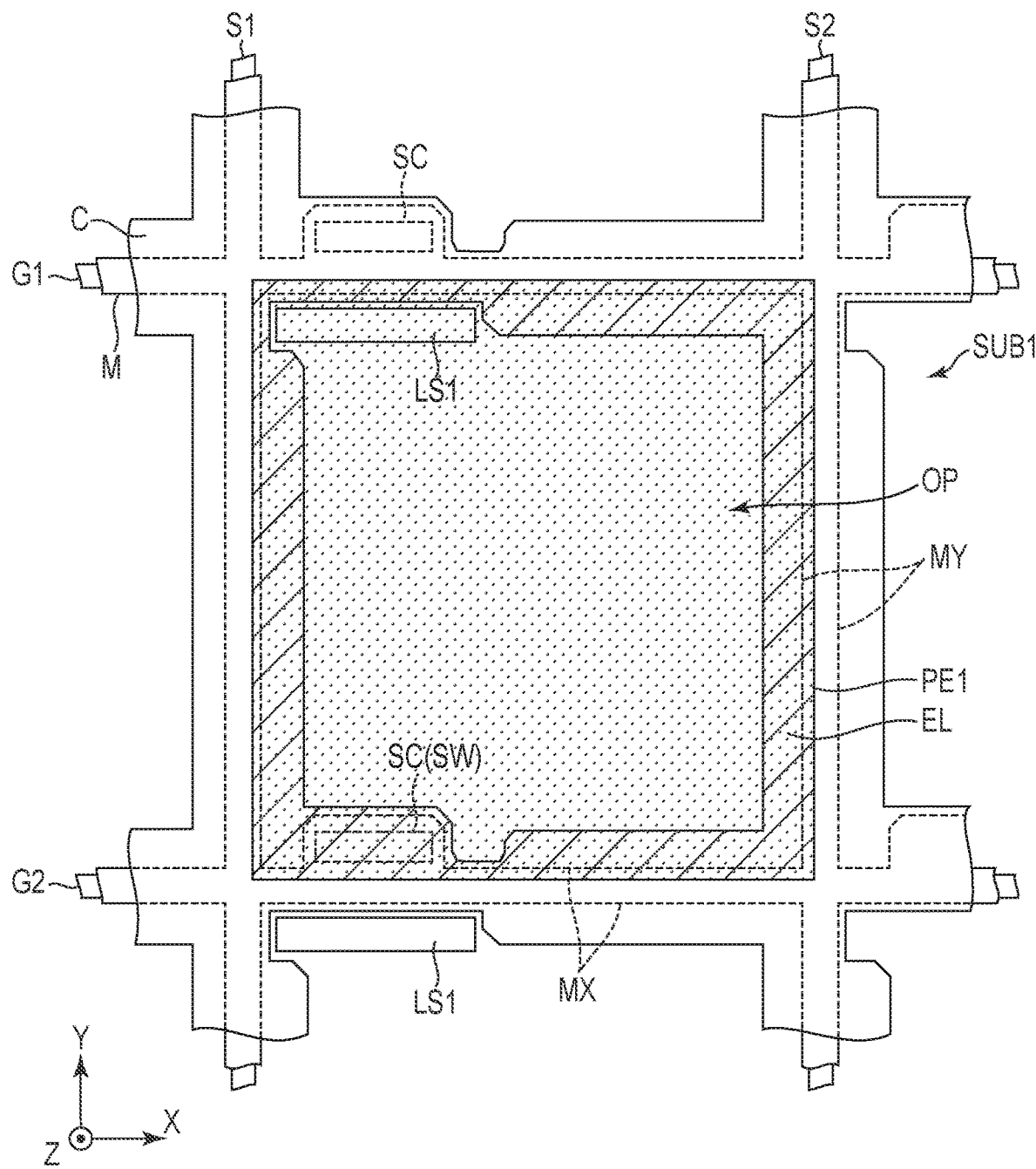
FIG. 14 is a plan view showing the first substrate SUB1 according to a seventh configuration example of the embodiments.

FIG. 14 is a plan view showing the first substrate SUB1 according to a seventh configuration example of the embodiments. A feature of the seventh configuration example shown in FIG. 14 is different from a feature of the first configuration example shown in FIG. 2 in that the capacitive electrode C comprises an electrode portion EL and an opening portion OP. That is, the electrode portion EL is overlaid on a peripheral edge portion of the pixel electrode PE1 as represented by hatch lines. In addition, the opening portion OP is overlaid on a central portion of the pixel electrode PE1. That is, the capacitive electrode C is formed in a grating shape in a planar view. In addition, the first light shielding portion LS1 is located in the opening portion OP, in the region overlaid on the pixel electrode PE1. The capacitive electrode C is overlaid on the metal line M and is electrically connected to the metal line M.

In such a seventh configuration example, too, the same advantages as those of the first configuration example can be obtained. In addition, the installation area (or volume) of the capacitive electrode C is smaller than that when the capacitive electrode C does not have the opening portion OP. For this reason, the light absorption of the light propagating at the first substrate SUB1, in the capacitive electrode C, can be suppressed.

In addition, an optimum capacitance can be formed between the pixel electrode PE1 and the capacitive electrode C by adjusting the area of the electrode portion EL (or the area of the opening portion OP). For example, an optimum capacitance can be formed by reducing the area of the electrode portion EL that is overlaid on the pixel electrode PE1 in response to the demand for reducing the scale of the switching element SW.

Eighth Configuration Example

Figure 15:
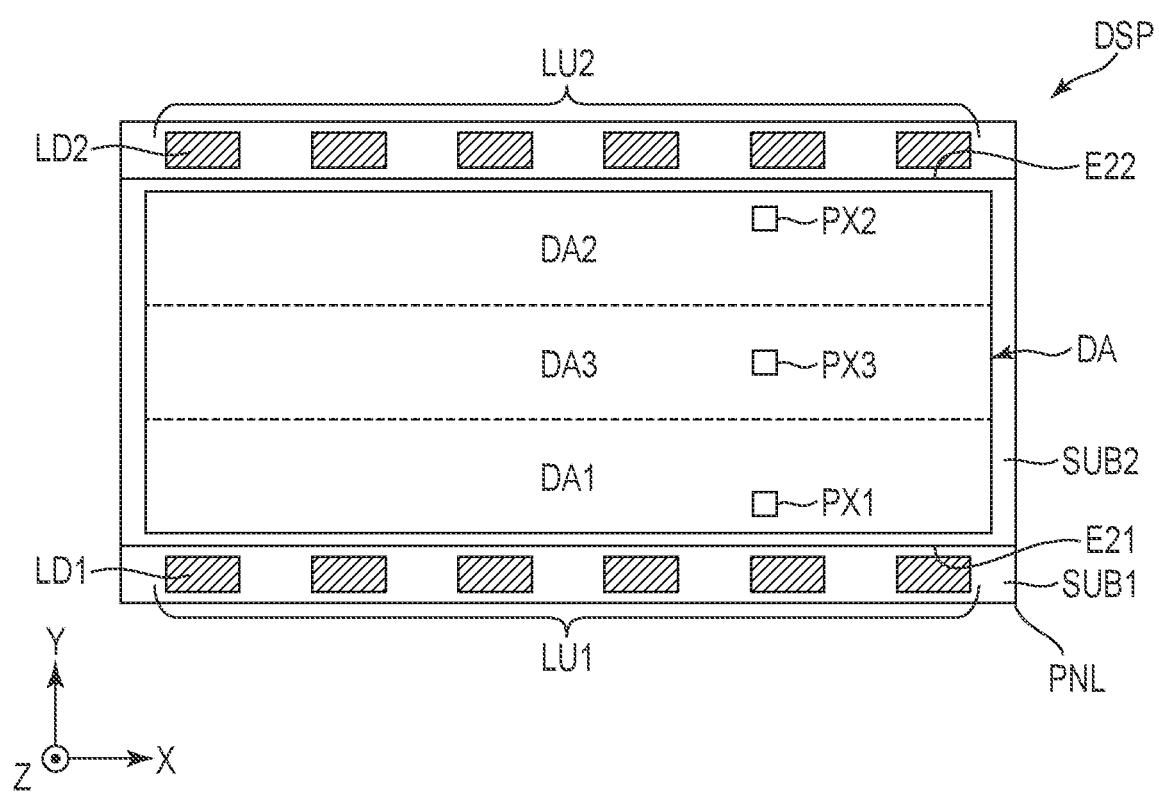
FIG. 15 is a plan view showing the display device DSP of an eighth configuration example.

FIG. 15 is a plan view showing the display device DSP of an eighth configuration example.

The display device DSP comprises the display panel PNL, a first light source unit LU1, and a second light source unit LU2. The display portion DA is provided between the first light source unit LU1 and the second light source unit LU2. In the example shown in FIG. 15, the display portion DA is formed in a rectangular shape extending in the first direction X. The display portion DA comprises a first region DA1, a second region DA2, and a third region DA3. The first region DA1 is a region located near the end part E21 of the second substrate SUB2 and includes the first pixel PX1. The second region DA2 is a region located near the end part E22 of the second substrate SUB2 and includes the second pixel PX2. The third region DA3 is a region located between the first region DA1 and the second region DA2 and includes the third pixel PX3.

The first light source unit LU1 comprises a plurality of light emitting elements LD1 arranged in the first direction X. These light emitting elements LD1 are arranged along the end part E21 to emit the light toward the end part E21. The second light source unit LU2 comprises a plurality of light emitting elements LD2 arranged in the first direction X. These light emitting elements LD2 are arranged along the end part E22 to emit the light toward the end part E22. That is, each of the light emitting elements LD1 and LD2 is provided along the longer side of the display portion DA.

The switching element SW in the first pixel PX1 comprises the semiconductor layer SC shown in FIG. 3. The first light shielding portion LS1, the second light shielding portion LS2, the third light shielding portion LS3, and the fourth light shielding portion LS4 shown in FIG. 3 are provided between the light emitting element LD1 and the semiconductor layer SC of the first pixel PX1.

The switching element in each of the second pixel PX2 and the third pixel PX3 will be described below.

Figure 16:
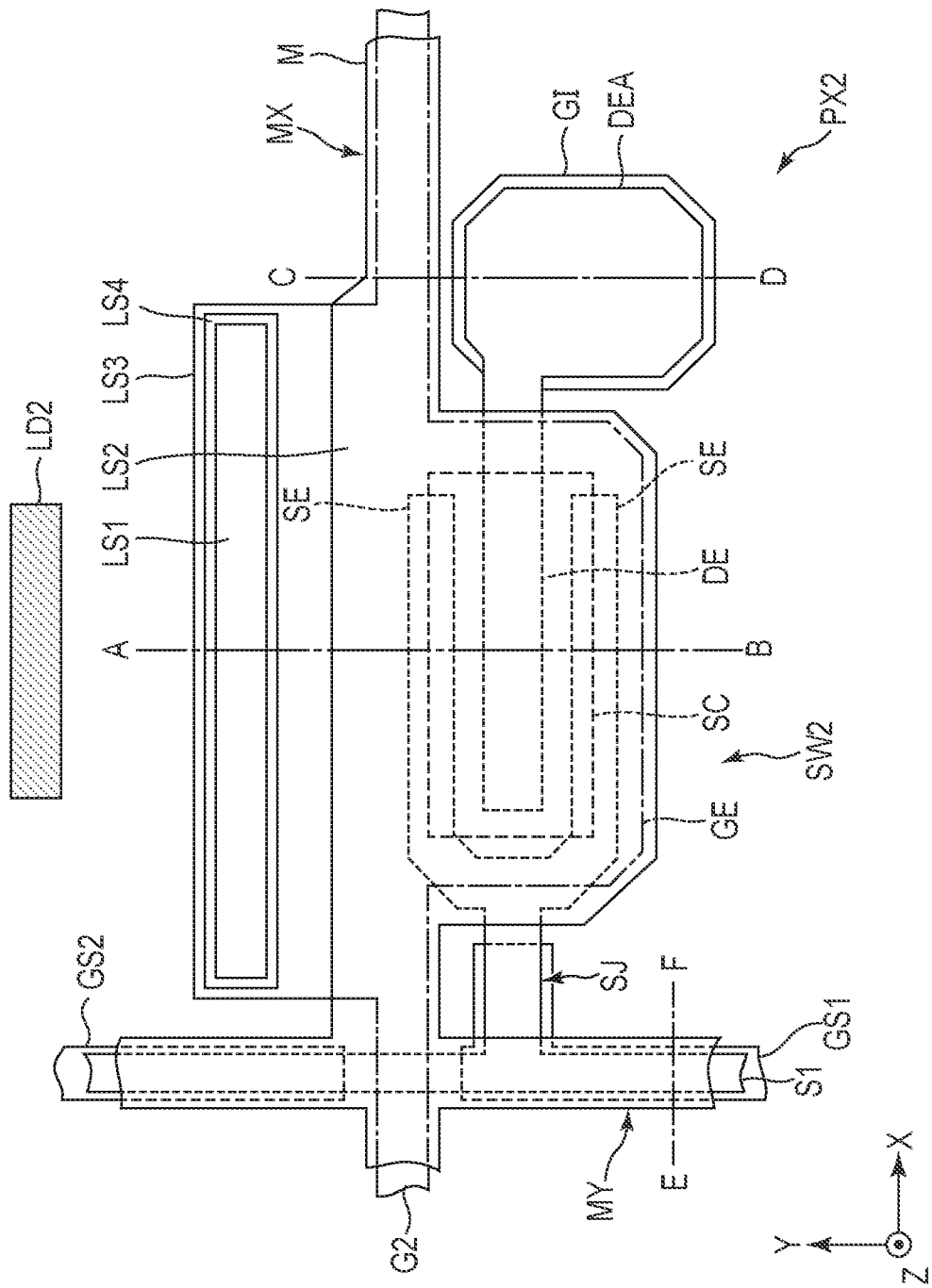
FIG. 16 is a plan view showing an example of a layout of a switching element SW2 and its peripheral portions in the second pixel PX2.

FIG. 16 is a plan view showing an example of a layout of a switching element SW2 and its peripheral portions in the second pixel PX2. When a tip of an arrow representing the second direction Y indicates an upper side and the opposite side is a lower side in FIG. 16, the layout shown in FIG. 16 corresponds to the layout obtained by vertically inverting the layout shown in FIG. 3.

Figure 17:
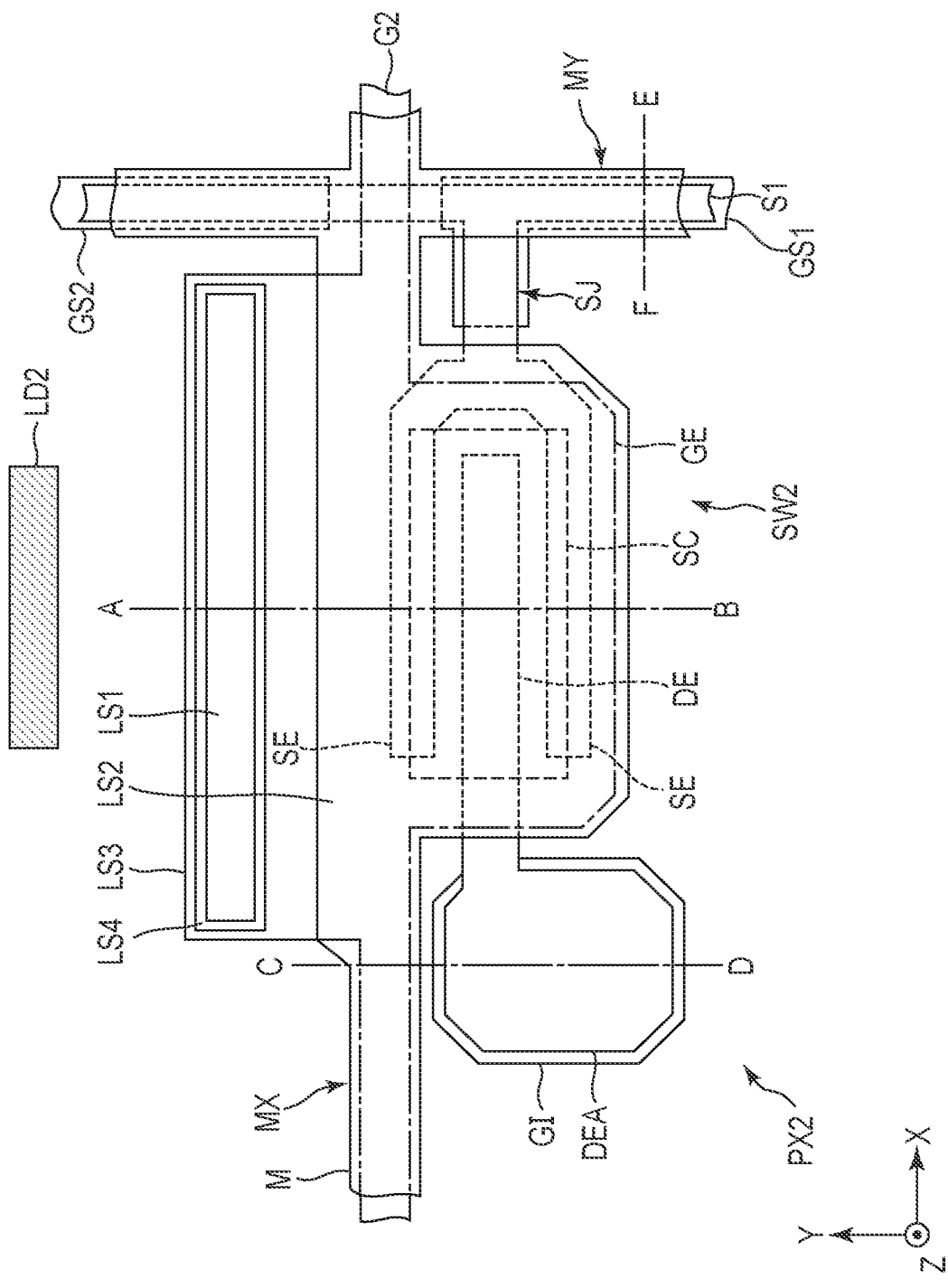
FIG. 17 is a plan view showing another example of the layout of the switching element SW2 and its peripheral portions in the second pixel PX2.

FIG. 17 is a plan view showing another example of the layout of the switching element SW2 and its peripheral portions in the second pixel PX2. When a tip of an arrow representing the second direction Y indicates an upper side and the opposite side is a lower side and when a tip of an arrow representing the first direction X indicates a right side and the opposite side is a left side in FIG. 17, the layout shown in FIG. 17 corresponds to the layout obtained by inverting the layout shown in FIG. 3 vertically and horizontally.

A cross-section of the display panel PNL taken along line A-B shown in FIG. 16 and FIG. 17 is similar to that shown in FIG. 4, a cross-section of the display panel PNL taken along line C-D is similar to that shown in FIG. 5, and a cross-section of the display panel PNL taken along line E-F is similar to that shown in FIG. 6.

The first light shielding portion LS1, the second light shielding portion LS2, the third light shielding portion LS3, and the fourth light shielding portion LS4 are provided between the light emitting element LD2 and the semiconductor layer SC of the switching element SW2.

Accordingly, the light traveling from the light emitting element LD2 to the switching element SW2 is shielded by the first light shielding portion LS1, the second light shielding portion LS2, the third light shielding portion LS3, and the fourth light shielding portion LS4. Therefore, in the switching element SW2, too, occurrence of the leak current in the semiconductor layer SC can be suppressed and the deterioration in the display quality such as the deterioration of the luminance due to the variation in the electric potential of the second pixel PX2 can be suppressed.

Figure 18:
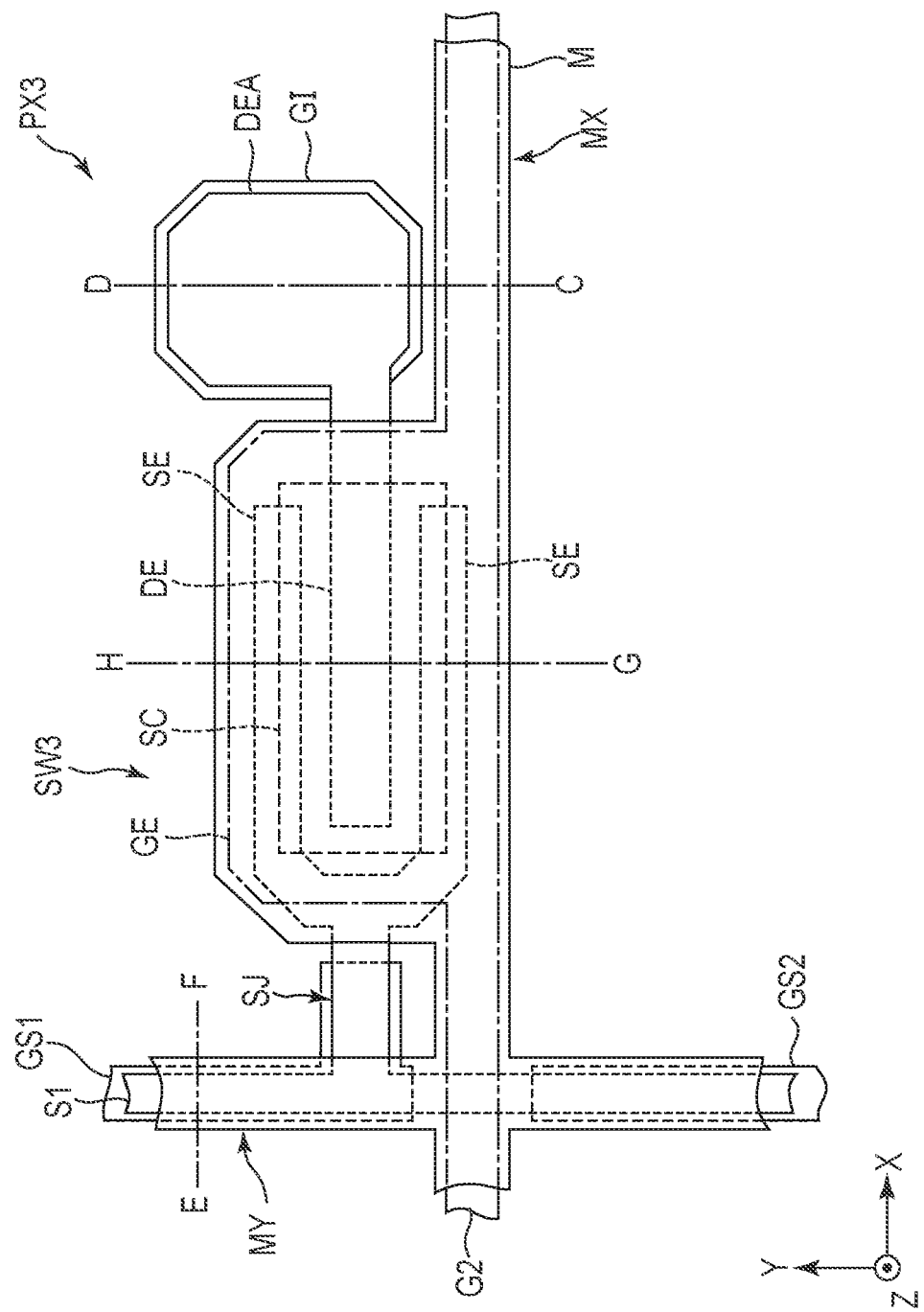
FIG. 18 is a plan view showing an example of a layout of a switching element SW3 and its peripheral portions in the third pixel PX3.

FIG. 18 is a plan view showing an example of a layout of a switching element SW3 and its peripheral portions in the third pixel PX3. The switching element SW3 shown in FIG. 18 is different from the switching element SW in the first pixel PX1 shown in FIG. 3 in that the first light shielding portion LS1, the second light shielding portion LS2, the third light shielding portion LS3, and the fourth light shielding portion LS4 are not provided. The cross-section of the display panel PNL taken along line C-D shown in FIG. 18 is similar to that shown in FIG. 5, and the cross-section of the display panel PNL taken along line E-F is similar to that shown in FIG. 6.

FIG. 19 is a cross-sectional view showing the first substrate SUB1 taken along line G-H shown in FIG. 18. The first substrate SUB1 shown in FIG. 19 is different from the first substrate SUB1 shown in FIG. 4B in that none of the through hole CH1 penetrating the insulating film 11 and the through hole CH2 penetrating the insulating film 12 is provided.

As shown in FIG. 18 and FIG. 19, since the first light-shielding portion LS1, the second light-shielding portion LS2, the third light-shielding portion LS3, and the fourth light-shielding portion LS4 are not provided in the third pixel PX3, the opening area per pixel (area contributing to the display) can be increased as compared with the first pixel PX1 and the second pixel PX2.

Ninth Configuration Example

Figure 20:
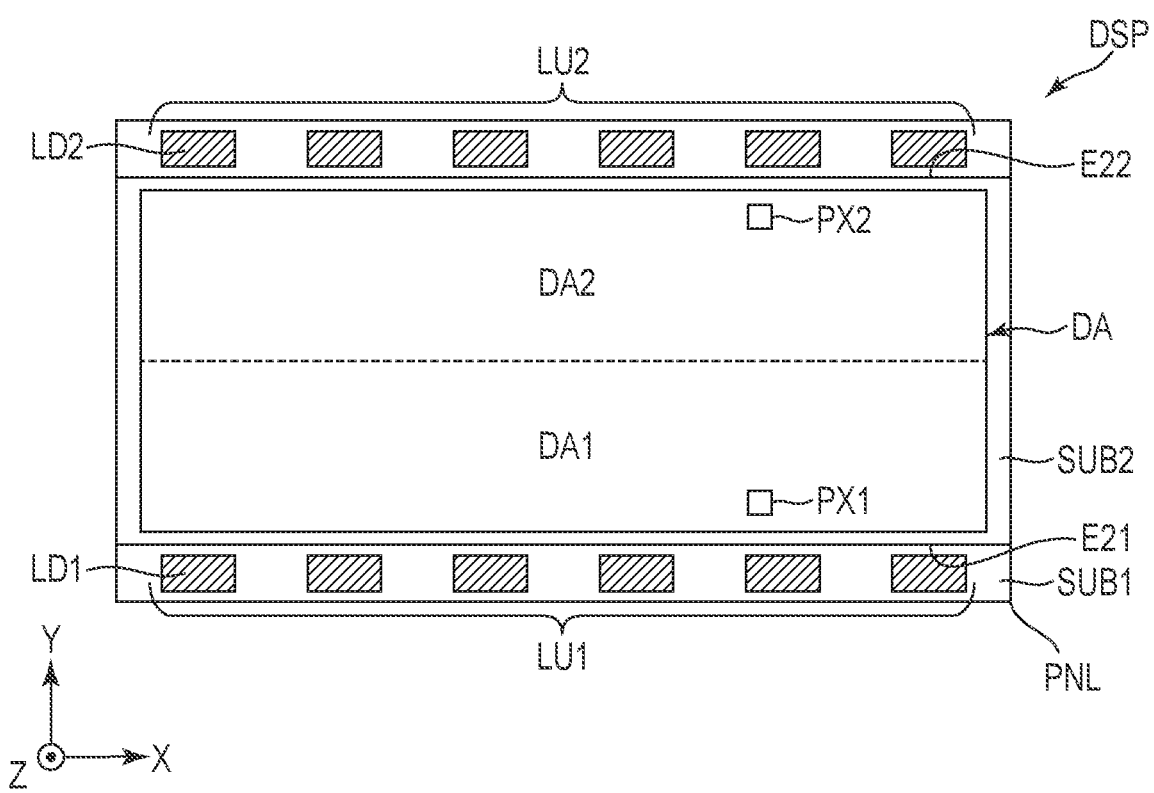
FIG. 20 is a plan view showing the display device DSP of a ninth configuration example.

FIG. 20 is a plan view showing the display device DSP of a ninth configuration example.

The display device DSP of the ninth configuration example shown in FIG. 20 is different from the display device DSP of the eighth configuration example shown in FIG. 15 in that the display portion DA does not comprise the third display portion. That is, the display portion DA comprises the first region DA1 located near the end part E21 and the second region DA2 located near the end part E22, and the first region DA1 and the second region DA2 are adjacent to each other in the direction Y.

The switching element SW in the first pixel PX1 in the first region DA1 is similar to that shown in FIG. 3. The first light shielding portion LS1, the second light shielding portion LS2, the third light shielding portion LS3, and the fourth light shielding portion LS4 shown in FIG. 3 are provided between the light emitting element LD1 and the semiconductor layer SC of the first pixel PX1.

The switching element SW2 in the second pixel PX2 of the second region DA2 is similar to that shown in FIG. 16 or FIG. 17. The first light shielding portion LS1, the second light shielding portion LS2, the third light shielding portion LS3, and the fourth light shielding portion LS4 are provided between the light emitting element LD2 and the semiconductor layer SC of the switching element SW2.

In such a ninth configuration example, too, occurrence of the leak current in the semiconductor layer SC can be suppressed in the switching element SW of the first pixel PX1 and the switching element SW2 of the second pixel PX2, similarly to the eighth configuration example.

As described above, according to the embodiments, a display device which can suppress degradation in the image quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate;
   a second substrate;
   a liquid crystal layer located between the first substrate and the second substrate and containing polymer and liquid crystal molecules; and
   a light emitting element opposed to an end of the second substrate, wherein
   the first substrate comprises:
   a plurality of scanning lines extending along a first direction and arranged in a second direction intersecting the first direction,
   a plurality of signal lines extending along the second direction and arranged in the first direction,
   a plurality of switching elements each connected to the plurality of scanning lines, the plurality of signal lines, and a plurality of pixel electrodes and each including a semiconductor layer,
   an inorganic insulating film covering the plurality of the signal lines,
   a first insulating film provided on the inorganic insulating film, overlapping the plurality of switching elements in a plan view, and including first side surfaces on the light emitting element side, and
   a plurality of first light shielding layers disposed at the first side surfaces of the first insulating film, and being in contact with the inorganic insulating film.

2. The display device of claim 1, wherein
the first insulating film is an organic insulating film.

3. The display device of claim 1, wherein
the first substrate comprises:

a transparent substrate;
a first inorganic insulating film disposed on the liquid crystal layer side of the transparent substrate; and
a second inorganic insulating film disposed on the liquid crystal layer side of the first inorganic insulating film, wherein
the switching elements are disposed between the first inorganic insulating film and the second inorganic insulating film.

4. The display device of claim 3, wherein
the first insulating film is disposed on the liquid crystal layer side of the second inorganic insulating film.

5. A display device comprising:
a first substrate;
a second substrate;
a liquid crystal layer located between the first substrate and the second substrate and containing polymer and liquid crystal molecules; and
a light emitting element opposed to an end of the second substrate, wherein
the first substrate comprises:
a plurality of scanning lines extending along a first direction and arranged in a second direction intersecting the first direction,
a plurality of signal lines extending along the second direction and arranged in the first direction,
a plurality of switching elements each connected to the plurality of scanning lines, the plurality of signal lines, and a plurality of pixel electrodes and each including a semiconductor layer,
a first insulating film overlapping the plurality of switching elements in a plan view, and including first side surfaces on the light emitting element side,
a plurality of first light shielding layers disposed at the first side surfaces of the first insulating film,
the second substrate includes a second light shielding layer including a plurality of opening portions at positions where the plurality of pixel electrodes are disposed in the plan view and overlapping the plurality of switching elements, the plurality of scanning lines, and the plurality of signal lines,
the first insulating film overlaps the second light shielding layer in the plan view, and
the first side surface of the first insulating film is disposed inside an end of the second light shielding layer.

6. The display device of claim 5, wherein
the first insulating film includes a second side surface opposed to the first side surface, and
the second side surface is disposed inside the end of the second light shielding layer.

7. The display device of claim 6, wherein
the first insulating film overlaps the plurality of scanning lines and the plurality of signal lines in the plan view,
the first side surface and the second side surface of the first insulating film are disposed inside the end of the second light shielding layer.

8. The display device of claim 5, wherein
the light emitting element is disposed to be opposed to the end of the second substrate in the second direction,
each semiconductor layer includes a long side extending in the second direction and a short side extending in the first direction, and
the first side surfaces where the first light shielding layers are disposed are side surfaces along the short side.

9. The display device of claim 5, wherein
the first insulating film overlaps the plurality of scanning lines and the plurality of signal lines in the plan view,
the first side surface of the first insulating film is disposed inside the end of the second light shielding layer.

* * * * *